United States Patent [19]
Yamakawa et al.

[11] Patent Number: 5,875,164
[45] Date of Patent: Feb. 23, 1999

[54] APPARATUS AND METHOD FOR RECORDING AND REPRODUCING INFORMATION FROM A PLURALITY OF RECORDING MEDIUM HAVING DIFFERENT THICKNESS AND RECORDING DENSITIES

[75] Inventors: Akio Yamakawa, Kanagawa; Kamon Uemura, Tokyo, both of Japan

[73] Assignee: Sony Corporation, Japan

[21] Appl. No.: 743,826

[22] Filed: Nov. 5, 1996

[30] Foreign Application Priority Data

Nov. 21, 1995 [JP] Japan ................................. 7-302415
Feb. 19, 1996 [JP] Japan ................................. 8-030231

[51] Int. Cl.$^6$ ........................... G11B 27/36; G11B 7/00
[52] U.S. Cl. .................... 369/58; 369/44.23; 369/112
[58] Field of Search ................................ 369/58, 44.42, 369/44.23, 44.25, 44.32, 111, 112, 120, 100, 13, 116; 359/654, 653; 250/201.5

[56] References Cited

U.S. PATENT DOCUMENTS

| | | | |
|---|---|---|---|
| 4,079,421 | 3/1978 | Kermisch | 348/272 |
| 4,672,187 | 6/1987 | Fujita et al. | 250/201.5 |
| 5,161,063 | 11/1992 | Krill et al. | 369/112 X |

FOREIGN PATENT DOCUMENTS

| | | |
|---|---|---|
| 0 470 807 | 2/1992 | European Pat. Off. . |
| 0 537 904 | 4/1993 | European Pat. Off. . |
| 0 610 055 | 8/1994 | European Pat. Off. . |
| 07057271 | 3/1995 | Japan . |
| WO 96 28815 | 9/1996 | WIPO . |

*Primary Examiner*—Ali Neyzari
*Attorney, Agent, or Firm*—Ronald P. Kananen

[57] ABSTRACT

A laser diode applies a laser beam through a grating, a beam splitter, and an objective to a compact disc. A laser beam reflected by the compact disc is applied through the objective and the beam splitter to a photodiode. The objective has a large numerical aperture of 0.6 in order to be able of play back a digital video disc that has a thin substrate and contains information recorded at a high density. To prevent the photodiode from suffering aberrations caused due to the large numerical aperture of the objective, the photodiode has a relatively small photodetector unit having a normalized detector size ranging from 3 $\mu$m to 16 $\mu$m, for detecting only returning light up to a numerical aperture of 0.3 and not detecting light of greater numerical aperture values.

12 Claims, 29 Drawing Sheets

F I G. 9
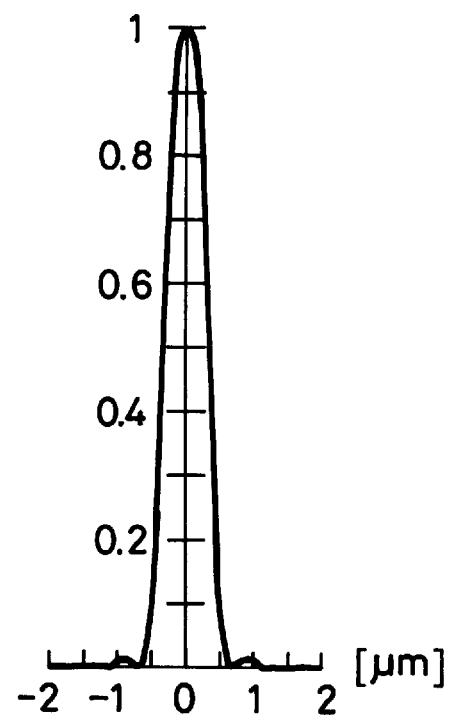

F I G. 10
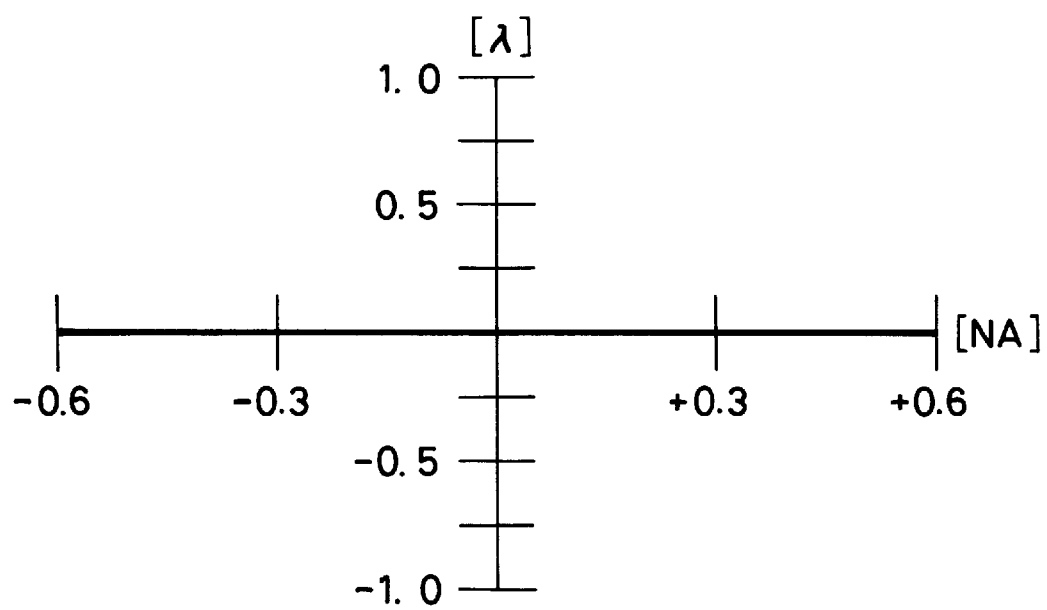

(0 μm)

(4.0 μm)

(8.0μm)

Point C
(10μm)

(12μm)

(16μm)

Point B
(24μm)

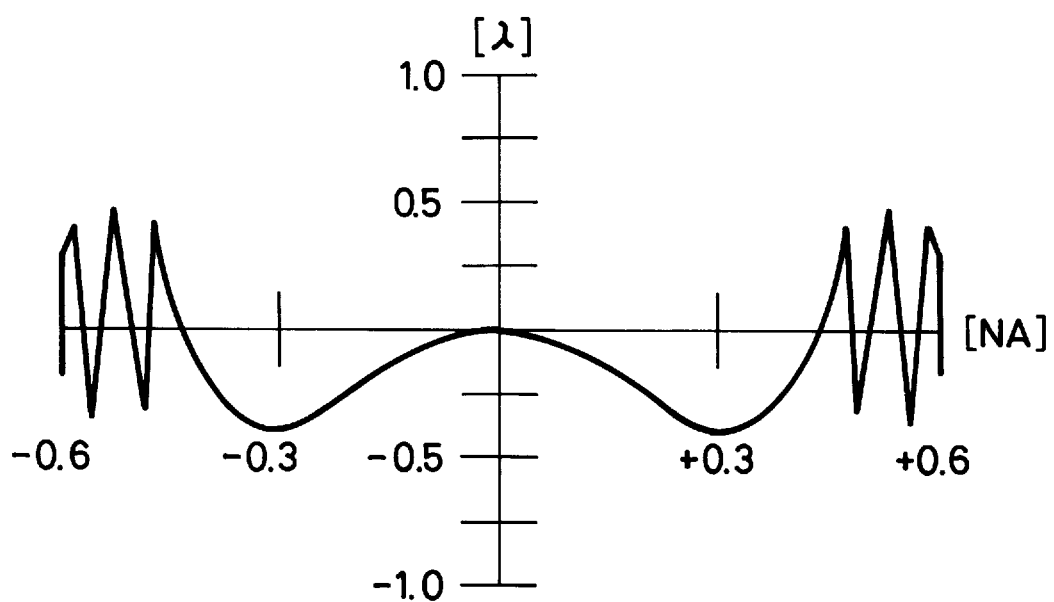
F I G. 21

F I G. 30A
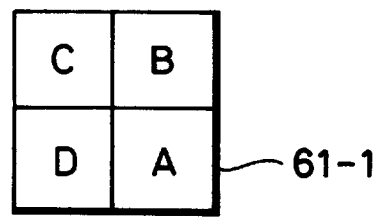
F I G. 30B
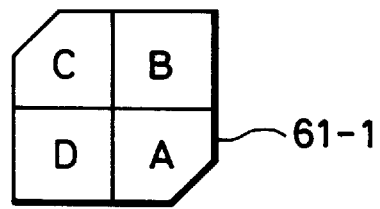
F I G. 30C
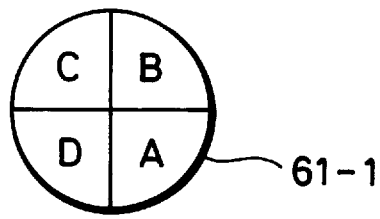

APPARATUS AND METHOD FOR RECORDING AND REPRODUCING INFORMATION FROM A PLURALITY OF RECORDING MEDIUM HAVING DIFFERENT THICKNESS AND RECORDING DENSITIES

BACKGROUND OF THE INVENTION

1. Field of the Invention

The present invention relates to an apparatus for and a method of recording information on or reproducing information from a recording medium and, more particularly, to an apparatus for and a method of recording information on or reproducing information from a plurality of disk-shaped recording mediums having different substrate thicknesses.

2. Description of the Related Art

Compact discs (CDs) have been widely used as a recording medium from which recorded information is reproduced with light. In recent years, a new recording medium, known as digital video disc (DVD), has been used for digitally recording video images over a long period of time.

For reading recorded digital information from an optical recording medium, a laser beam is applied to the optical recording medium, light reflected from the optical recording medium is detected, and the level of the reflected light is converted into binary data.

FIG. 1 of the accompanying drawings shows an optical pickup device for use with a CD. As shown in FIG. 1, a laser diode (LD) 1 emits a laser beam having a wavelength of 780 nm. The laser beam emitted from the LD 1 is divided into a plurality of laser beams, e.g., three laser beams, by a grating 2. One of the three laser beams is used to read recorded information and to control the optical pickup device in focusing servo operation. The remaining two laser beams are used to control the optical pickup device in tracking servo operation. The three laser beams will also be referred to collectively as light.

A beam splitter 3 that comprises a transparent planar plate reflects the laser beams from the grating 2 toward an objective 4. Light (converged light) reflected from a CD 10 and transmitted through the objective 4 passes through the beam splitter 3 toward a photodiode (PD) 5 that serves as a photodetector. While the reflected light is passing through the beam splitter 3, the reflected light is given astigmatism by the beam splitter 3.

The objective 4 converges the laser beams onto an information recording layer 12 that comprises minute pits on the CD 10. The objective 4 also converges light reflected from the information recording layer 12 of the CD 10 through the beam splitter 3 onto the photodiode 5.

The larger the numerical aperture (NA) of the objective 4, the larger the angle through which the objective 4 converges light into a smaller spot. In FIG. 1, the objective 4 has an NA of 0.45.

The photodiode 5 detects the returning light reflected from the CD 10. Since the laser beam emitted from the LD 1 is divided into three laser beams, the photodiode 5 has three corresponding photodetector units. One of the photodetector areas serves to detect the laser beam that is used to read recorded digital information. The remaining two photodetector areas serve to detect the two laser beams for tracking servo control. Specifically, based on the difference between the optical energy quantities of the two tracking laser beams, the objective 4 is controlled to apply the laser beam used to read recorded digital information to a predetermined track on the CD 10 in tracking servo operation.

Since the light reflected from the information recording layer 12 and applied to the photodiode 5 passes as converged light through the beam splitter 3, the light is subject to astigmatism. The objective 4 is controlled in focusing servo operation based on the astigmatism thus produced.

The CD 10 has a transparent substrate 11 having a thickness t of 1.2 mm with the information recording layer 12 disposed thereon and a protective film 13 disposed on the information recording layer 12. The laser beams from the LD 10 are converged by the objective 4 and pass through the transparent substrate 11 to the information recording layer 12 that has minute pits representative of recorded information. When the laser beams are applied to pits, they are diffracted, causing the returning light that is reflected by the recording medium and applied to the photodiode 5 to be reduced in intensity. When the laser beams are applied to a pit-free area of the information recording layer 12, they are reflected, and hence the returning light has a high intensity. The returning light from the CD 10 is detected by the photodiode 5, which converts higher and lower intensities of the returning light into respective binary levels of "1" and "0", thereby reading the digital information recorded as pits on the CD 10.

While the objective 4 is being thus controlled in tracking and focusing servo modes, the laser beams are applied to a given position on the CD 10, and the returning light is detected to read the recorded digital information from the CD 10.

FIG. 2 of the accompanying drawings illustrates a digital video disc (DVD) 20 that has been proposed recently. The DVD 20 has digital information recorded in a double-sided structure, whereas the CD 10 has digital information recorded in a single-side structure. Specifically, the DVD 20 includes a first disc member comprising a substrate 21, an information recording layer 22 disposed on the substrate 21, and a protective film 23 disposed on the information recording layer 22, and a second disc member comprising a substrate 31, an information recording layer 32 disposed on the substrate 31, and a protective film 33 disposed on the information recording layer 32, the first and second disc members being bonded to each other through the protective films 23, 33. Therefore, the DVD 20 is symmetrical with respect to a median plane thereof.

Since digital information is recorded with high density on the DVD 20, the substrates 21, 31 are thinner than the substrate 11 of the CD 10 in order to minimize skews and errors of substrate thicknesses. Specifically, while the substrate 11 of the CD 10 has a thickness of 1.2 mm, each of the substrates 21, 31 of the DVD 20 has a thickness of 0.6 mm. The length of and intervals between the pits on the DVD 20 are smaller than those of the CD 10.

Inasmuch as the recording density of the DVD 20 is greater than the recording density of the CD 10, an LD 41 of an optical pickup device for use with the DVD 20 emits a laser beam having a shorter wavelength of 650 nm than the LD 1 of the optical pickup device for use with the CD 10. The optical pickup device for use with the DVD 20 has other components including a grating 42, a beam splitter 43, an objective 44, and a photodiode (PD) 45 that are identical to those of the optical pickup device for use with the CD 10.

However, because the DVD 20 has pits smaller than the CD 10 due to the larger recording density, the objective 44 has a numerical aperture (NA) of 0.6, which is greater than the objective 4 (NA=0.45) of the optical pickup device for use with the CD 10. The objective 44 with the larger numerical aperture is capable of converging a laser beam into a smaller spot to read smaller pits.

As described above, the CD 10 and the DVD 20 are structurally different from each other. Usually, therefore, it is necessary to use different optical systems (optical pickup devices) for reading recorded information from the CD 10 and the DVD 20.

If the optical pickup device for use with the DVD 20 is applied to the CD 10, for example, as shown in FIG. 3 of the accompanying drawings, then since the optical pickup device for use with the DVD 20 is designed to read the recorded information from the DVD 20 under optimum conditions, it suffers spherical aberration due to the difference between the thicknesses of the substrate 11 of the CD 10 and the substrates 21, 31 of the DVD 20 and the difference between the numerical apertures of the objectives 4, 44 when reading the recorded information from the CD 10.

For example, when a CD whose substrate has a thickness of 1.2 mm is played back using an objective having a numerical aperture of 0.6 which is optimized for a DVD whose substrate has a thickness of 0.6 mm, the amount of spherical aberration that is produced reaches 3.6 $\mu$m in terms of a fourth-order Seidel spherical aberration coefficient $W_{40}$. If this amount of spherical aberration is expressed by a root-mean-square value, it is 0.268 rms$\mu$m (which is 0.412 rms$\lambda$ if normalized at a wavelength $\lambda$ of 650 nm). Generally, all optical systems for use with optical discs are required to have the sum of root-mean-square values of aberrations equal to or smaller than the Maréchal's criterion of 0.07 rms$\lambda$. Therefore, it is difficult to accurately read the recorded information from the CD 10 with the optical system arrangement shown in FIG. 3.

It has been proposed to adjust the numerical aperture of an objective to the types of different recording mediums for making an optical pickup device for use with a DVD applicable to a CD, as disclosed, for example, in Japanese patent application No. 6-277400 (which corresponds to copending U.S. patent application Ser. No. 08/555,339).

FIGS. 4 and 5 of the accompanying drawings show an optical system based on the principles of the above proposal. As shown in FIGS. 4 and 5, the optical system comprises a diaphragm 51, an actuator 53 for actuating the diaphragm 51, and a sensor 52 for detecting the type of recording medium which is used, in addition to the optical pickup device for use with a DVD, as shown in FIG. 2.

The sensor 52 detects the type of recording medium used, and the actuator 53 actuates the diaphragm 51 based on a detected signal from the sensor 52. Specifically, for reading the recorded information from the DVD 20, the actuator 53 actuates the diaphragm 51 to increase the opening thereof until the numerical aperture of the objective 44 becomes 0.6, as shown in FIG. 4. For reading the recorded information from the CD 10, the actuator 53 actuates the diaphragm 51 to reduce the opening thereof until the numerical aperture of the objective 44 becomes 0.45, as shown in FIG. 5. The opening of the diaphragm 51 is thus reduced to minimize the spherical aberration (the fourth-order Seidel spherical aberration coefficient $W_{40}$ is proportional to the fourth power of the numerical aperture NA) for reading the recorded information from the CD 10.

However, because the mechanical diaphragm 51 is newly added, the optical system is made up of an increased number of parts, expensive to manufacture, and large in size and complex in structure. Since the diaphragm 51 is mechanically operated, it is not resistant to vibrations, cannot operate quickly, and tends to cause a fault in the optical system.

SUMMARY OF THE INVENTION

It is therefore an object of the present invention to provide an apparatus for and a method of recording information on or reproducing information from different types of recording mediums stably with a relatively small, simple, and inexpensive arrangement that requires no mechanical diaphragm, based on the detection of light returning from the recording medium and entering a predetermined range.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, there is provided an apparatus for recording information selectively on and reproducing information selectively from a first recording medium having an information recording layer on a substrate having a first thickness and a second recording medium having an information recording layer on a substrate having a second thickness, comprising generating means for generating light to be applied to the information recording layer of the first or second recording medium, applying means for converging the light generated by the generating means and applying the converged light to the information recording layer of the first or second recording medium, and photodetector means for detecting returning light from the information recording layer of the first or second recording mediums, the photodetector means having a normalized detector size of at least 3 $\mu$m and at most 16 $\mu$m.

According to the present invention, there is also provided a method of recording information selectively on and reproducing information selectively from a first recording medium having an information recording layer on a substrate having a first thickness and a second recording medium having an information recording layer on a substrate having a second thickness, the second thickness being larger than the first thickness, with an optical pickup device having generating means for generating light to be applied to the information recording layer of the first or second recording medium through the substrate thereof, applying means for converging the light generated by the generating means and applying the converged light to the information recording layer of the first or second recording medium, and photodetector means for detecting returning light from the information recording layer of the first or second recording mediums, the method comprising the step of detecting the returning light from the information recording layer with the photodetector means which has a normalized detector size of at least 3 $\mu$m and at most 16 $\mu$m.

According to the present invention, there is further provided an apparatus for recording information selectively on and reproducing information selectively from a first recording medium having an information recording layer on a substrate having a first thickness and a second recording medium having an information recording layer on a substrate having a second thickness, comprising generating means for generating light to be applied to the information recording layer of the first or second recording medium, applying means for converging the light generated by the generating means and applying the converged light to the information recording layer of the first or second recording medium, and photodetector means for detecting returning light from the information recording layer of the first or second recording mediums, the photodetector means having a normalized detector size that is larger than a diameter of a spot on the photodetector means of returning light of a first numerical aperture $N_1$, from the first recording medium and smaller than a diameter of a spot on the photodetector means of returning light of a numerical aperture greater than a second numerical aperture $N_2$ from the second recording medium.

According to the present invention, there is also provided a method of recording information selectively on and reproducing information selectively from a first recording medium having an information recording layer on a substrate having a first thickness and a second recording medium having an information recording layer on a substrate having a second thickness, the second thickness being larger than the first thickness, with an optical pickup device having generating means for generating light to be applied to the information recording layer of the first or second recording medium through the substrate thereof, applying means for converging the light generated by the generating means and applying the converged light to the information recording layer of the first or second recording medium, and photodetector means for detecting returning light from the information recording layer of the first or second recording mediums, the method comprising the step of detecting the returning light from the information recording layer with the photodetector means which has a normalized detector size that is larger than a diameter of a spot on the photodetector means of returning light of a first numerical aperture $N_1$ from the first recording medium and smaller than a diameter of a spot on the photodetector means of returning light of a numerical aperture greater than a second numerical aperture $N_2$ from the second recording medium.

BRIEF DESCRIPTION OF THE DRAWINGS

The present invention will become more clearly appreciated as the disclosure of the invention is made with reference to the accompanying drawings. In the drawings:

FIG. 9 is a diagram showing a distribution of intensities of returning light with the optical pickup device shown in FIG. 6 used with a DVD;

FIG. 10 is a diagram showing spherical aberration with the optical pickup device shown in FIG. 6 used with a DVD;

FIG. 21 is a diagram showing spherical aberration with the optical pickup device shown in FIG. 6 used with a CD;

FIGS. 30A, 30B, and 30C are diagrams showing other configurations for a photodetector unit in the apparatus shown in FIG. 29;

DETAILED DESCRIPTION OF THE PREFERRED EMBODIMENTS

Figure 1:
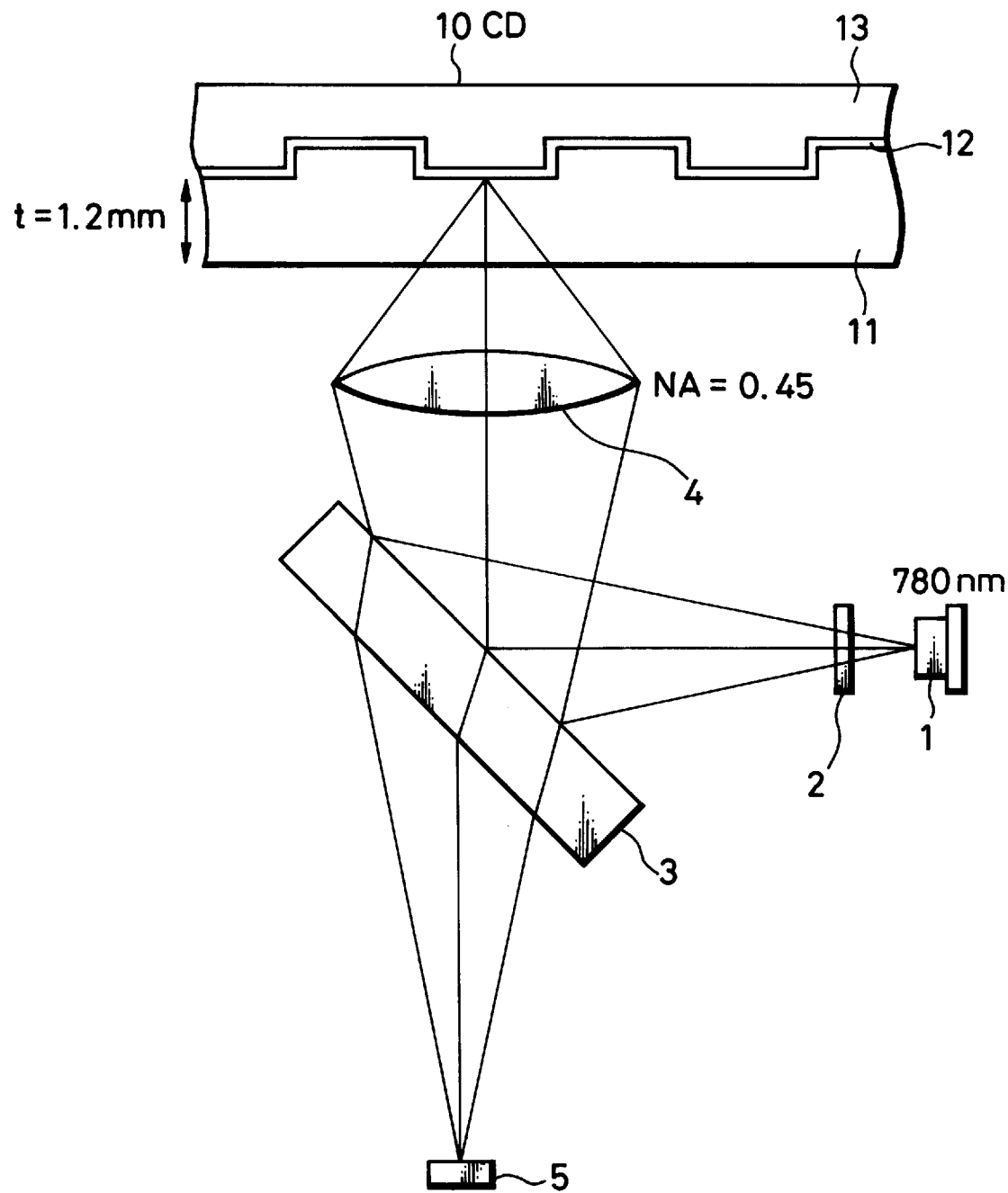
FIG. 1 is a cross-sectional view of a conventional optical pickup device for use with a CD.
Figure 2:
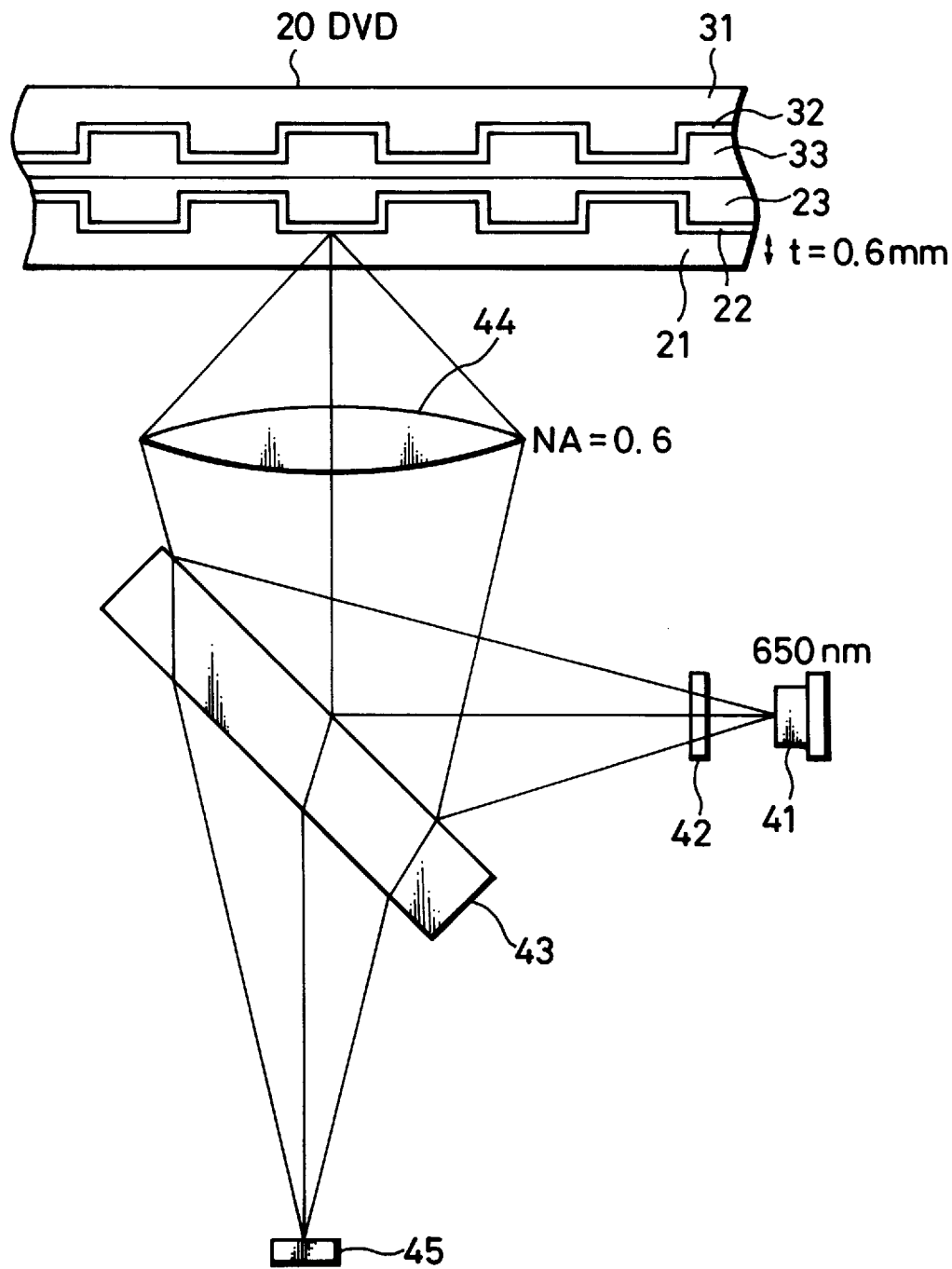
FIG. 2 is a cross-sectional view of a conventional optical pickup device for use with a DVD.
Figure 3:
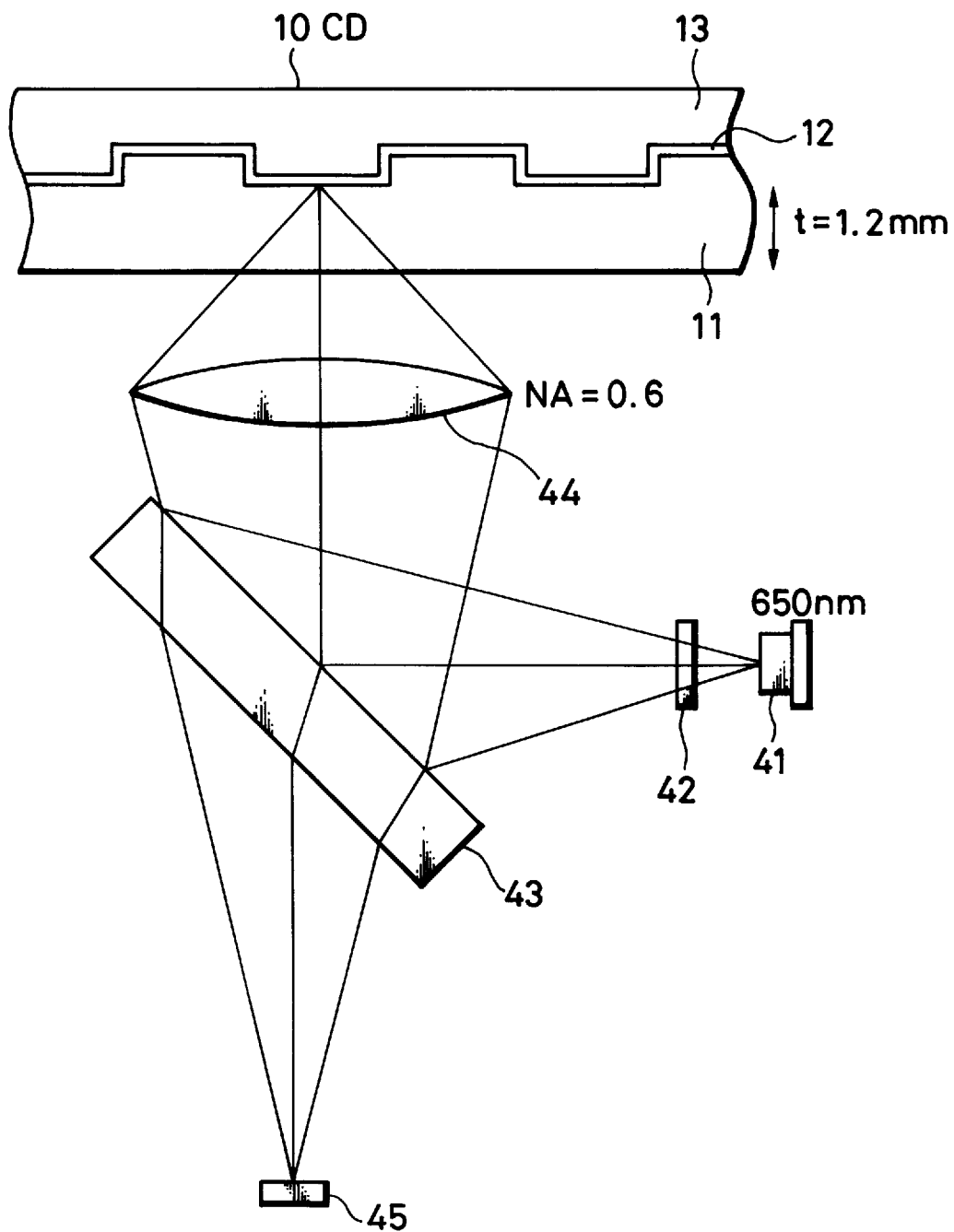
FIG. 3 is a cross-sectional view showing the conventional optical pickup device, which is illustrated in FIG. 2, used with a CD.
Figure 4:
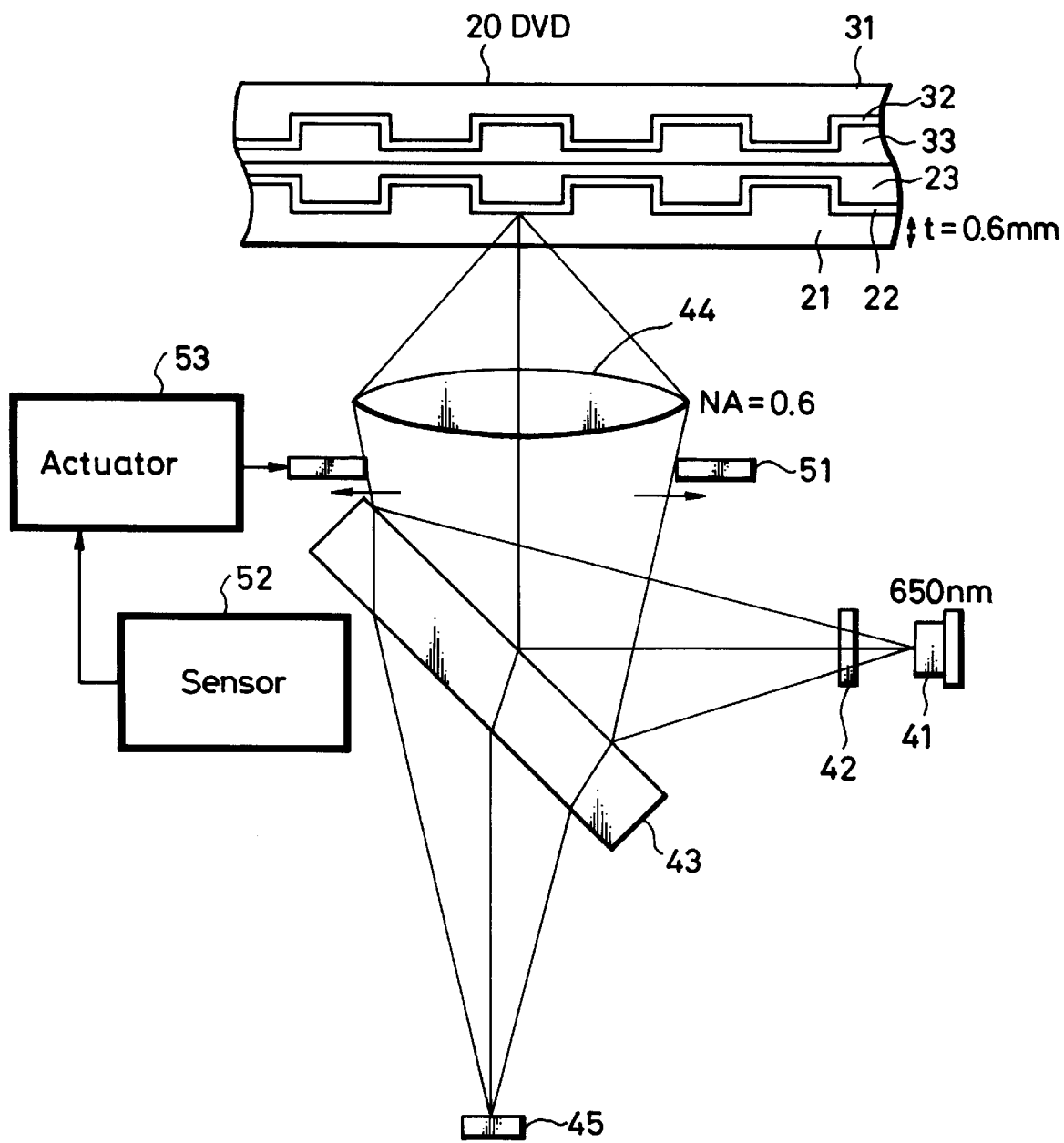
FIG. 4 is a cross-sectional view of a conventional optical pickup device that can be used with both a CD and a DVD.
Figure 5:
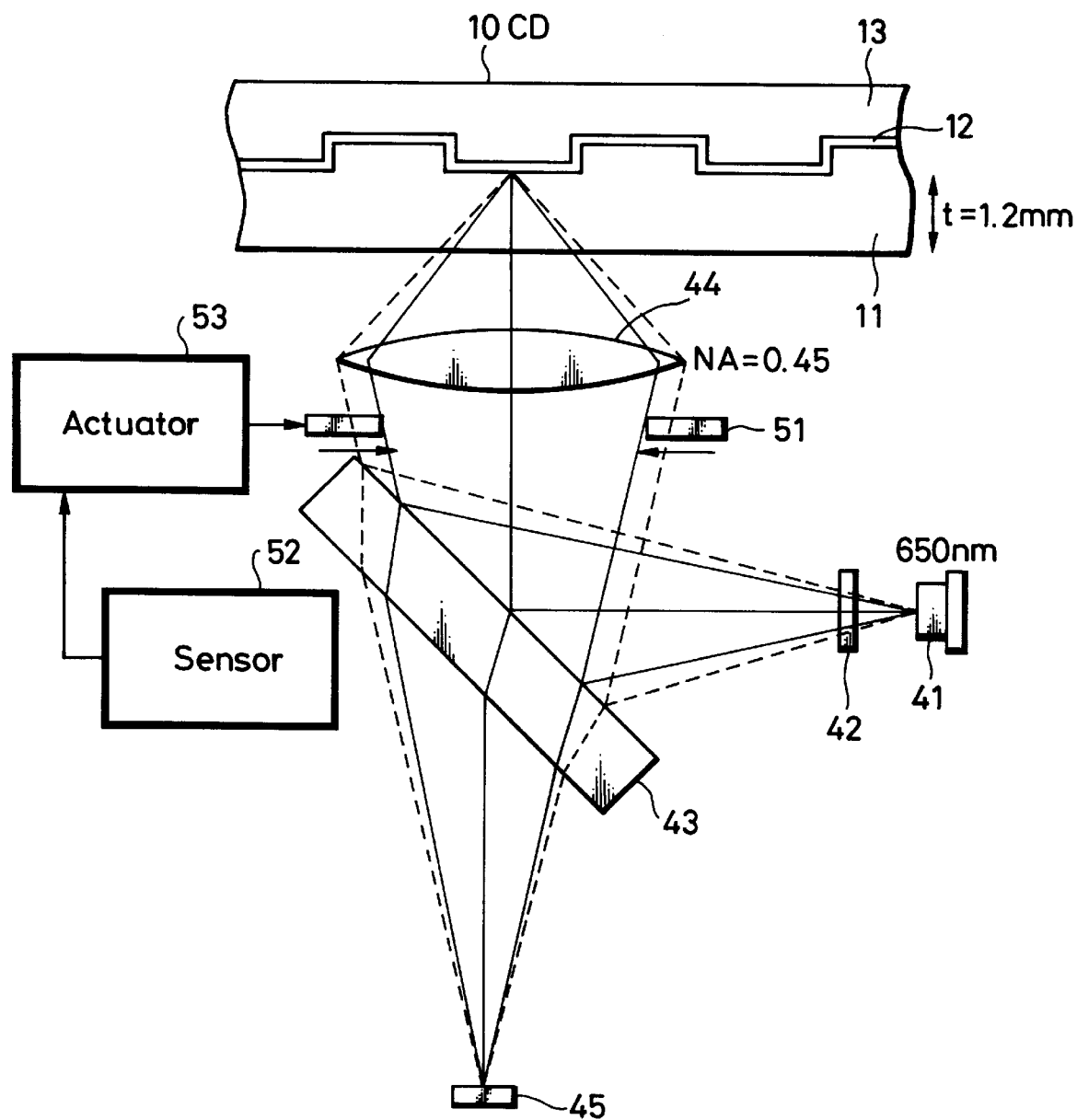
FIG. 5 is a cross-sectional view showing the conventional optical pickup device, which is illustrated in FIG. 4, used with a CD.
Figure 6:
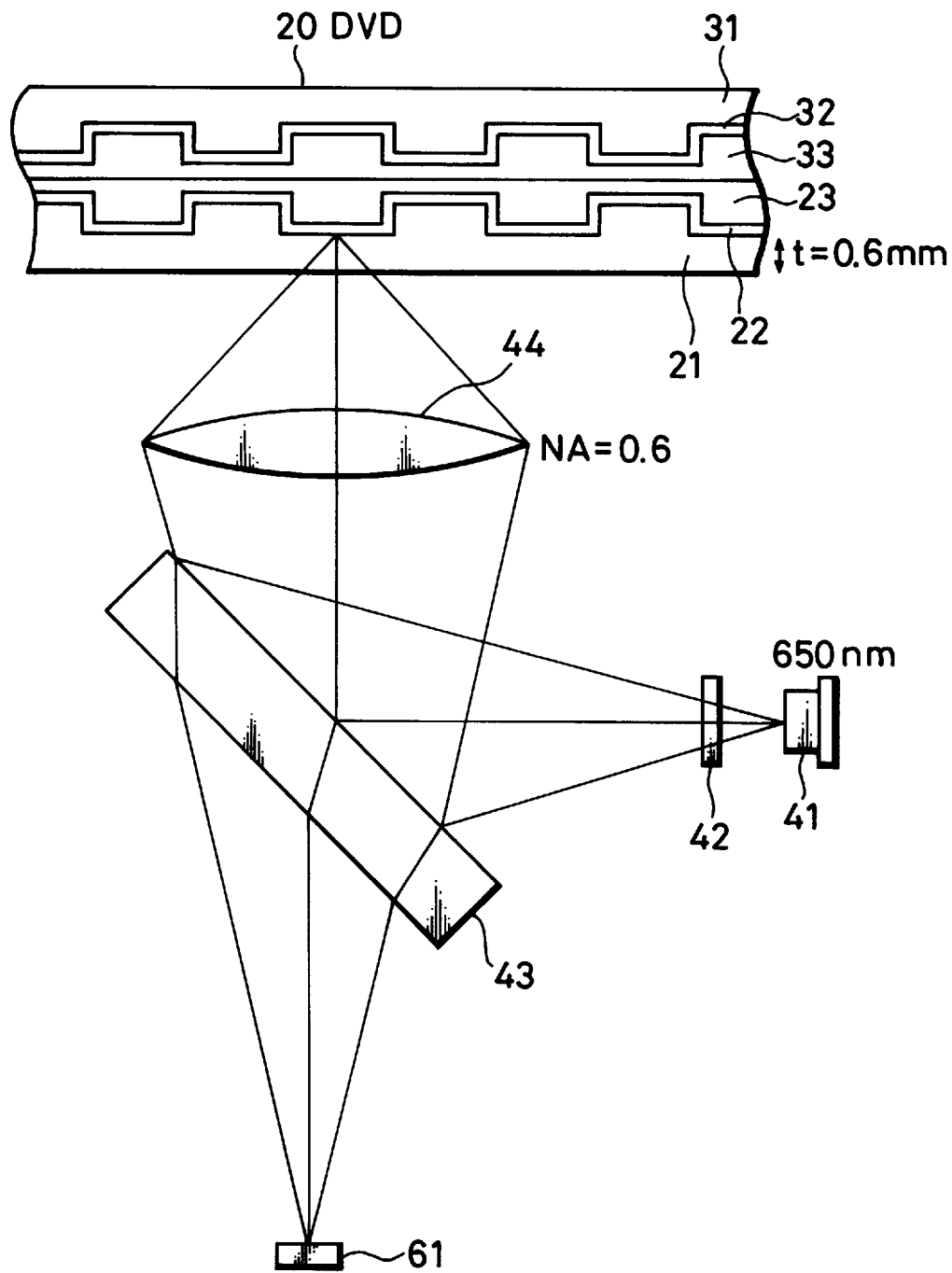
FIG. 6 is a cross-sectional view of an optical pickup device of an apparatus for recording information on or reproducing information from a recording medium according to the present invention.

FIG. 6 shows in cross section an optical pickup device of an apparatus for recording information on or reproducing information from a recording medium according to the present invention. As shown in FIG. 6, the optical pickup device comprises an LD 41 (light generating means) for generating a laser beam having a wavelength of 650 or 635 nm, a grating 42 for dividing the laser beam generated by the LD 41 into three laser beams, a beam splitter 43 for separating the laser beams applied to a recording medium and laser beams reflected from the recording medium and imparting astigmatism to the reflected laser beams, an objective 44 (applying means) for applying the laser beam to the recording medium, the objective 44 having a numerical aperture (NA) of 0.6, and a photodiode 61 (photodetector means) for detecting the reflected laser beams, the photodiode 61 having small photodetector units. The photodiode 61 detects only returning light (reflected light) entering within a predetermined range, and does not detect any returning light that falls outside of the predetermined range.

The sizes of the photodetector units of the photodiode 61 will be described below.

Figure 7:
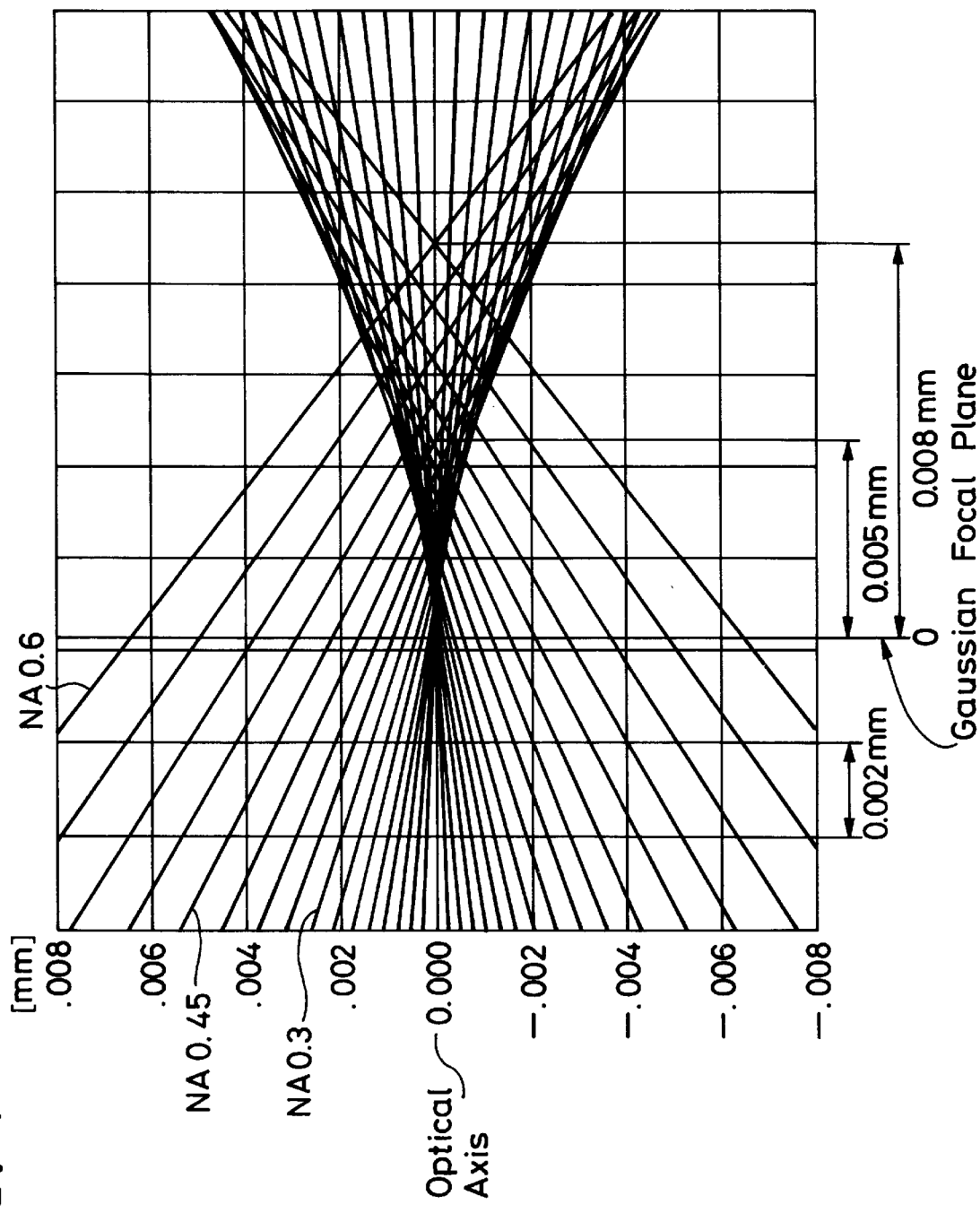
FIG. 7 is a diagram showing an example of tracked rays of returning light in the optical pickup device shown in FIG. 6.

FIG. 7 shows tracked rays of returning light in the optical pickup device shown in FIG. 6 in the case where the thickness of a substrate of a recording medium has increased by 0.1 mm from 0.6 mm (the thickness of the substrates 21, 31 of the DVD 20) to 0.7 mm.

As shown in FIG. 7, the farther the light applied to the photodiode 61 is spaced from the optical axis, i.e., the larger the NA for the light is, the greater the distance by which the focused point of the light is spaced from the Gaussian focal plane. If the NA is 0.45, then the focused point is spaced from the Gaussian focal plane by about 5 μm. If the NA is 0.6, then the focused point is spaced from the Gaussian focal plane by about 8.3 μm. In the case where the thickness of a substrate of a recording medium has increased by 0.6 mm from 0.6 mm to 1.2 mm (which is the thickness of the substrate 11 of the CD 10), the distance by which the focused point is spaced from the Gaussian focal plane if the NA is 0.6 is about 51.8 μm (=8.3 μm×0.6 mm/0.1 mm). As a result, the focused point is widely spaced from the Gaussian focal plane.

Figure 8:
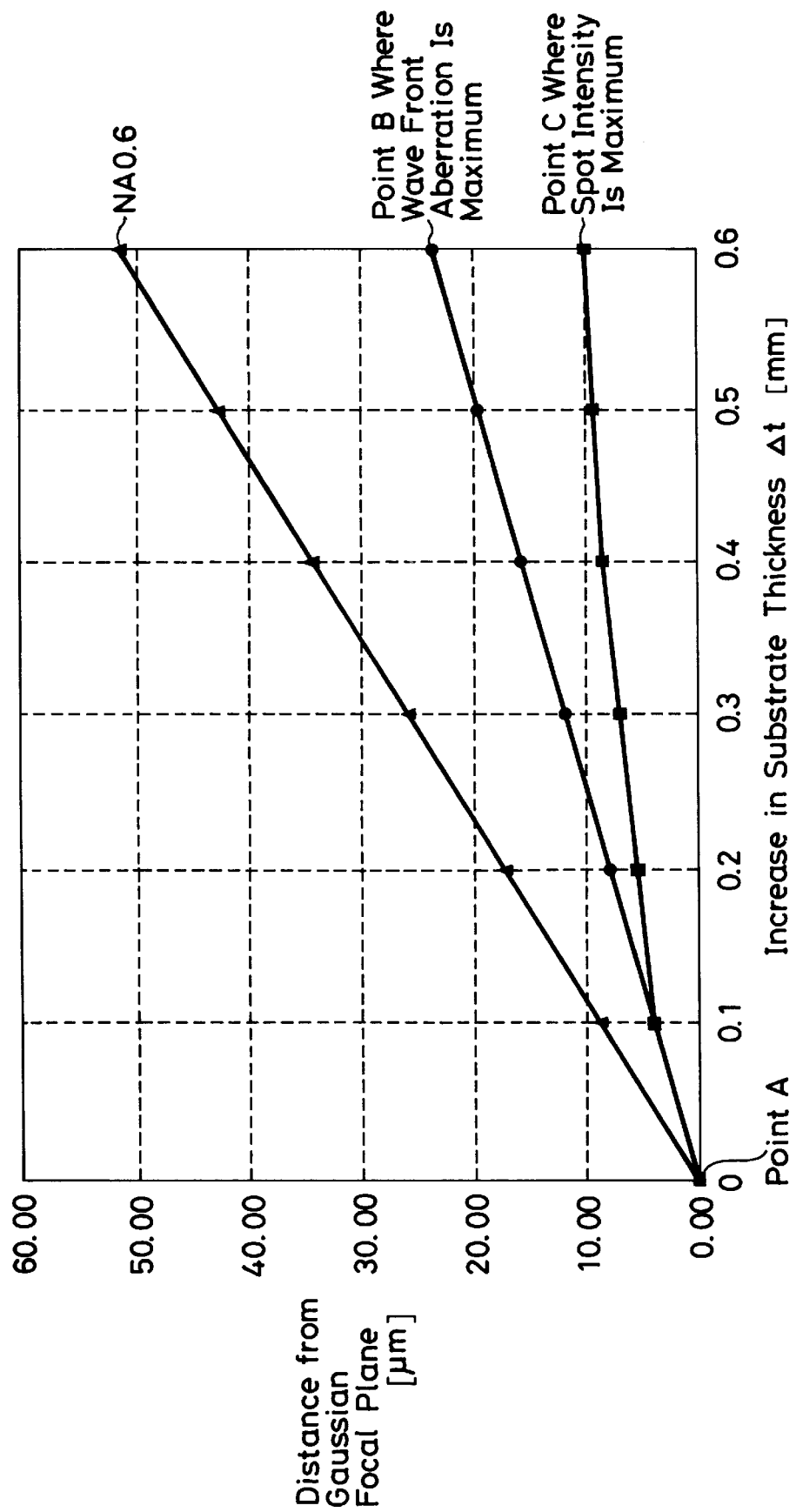
FIG. 8 is a diagram showing the relationship between increases in the thickness of a substrate of a recording medium and distances from a Gaussian focal plane to given points.

FIG. 8 shows the relationship between increases Δt in the thickness of a substrate of a recording medium (starting from a thickness of 0.6 mm at point A, which is the thickness of each of the substrates 21, 31 of the DVD 20), and distances from the Gaussian focal plane to given points, i.e., a point where the light of the NA of 0.6 is converged, a point where wavefront aberration (rms) is minimum, and a point on the optical axis where a spot intensity is maximum.

The optical pickup device shown in FIG. 6 being used with a DVD corresponds to a point A in FIG. 8. Specifically, in the case where the thickness of the substrate is 0.6 mm (the increase Δt in the thickness is 0 mm), the point where the light of the NA of 0.6 is converged, the point where wavefront aberration is minimum, and the point on the optical axis where the spot intensity is maximum are all positioned on the Gaussian focal plane. In the case where the thickness of the substrate increases, these points are spaced farther from the Gaussian focal plane by distances that are different for each particular point.

If the optical pickup device shown in FIG. 6 is used with a CD where the thickness of the substrate is 1.2 mm (the increase Δt in the thickness is 0.6 mm), then the distance of the point where wavefront aberration is minimum from the Gaussian focal plane is about 24 μm, as indicated by a point B, and the point on the optical axis where the spot intensity is maximum (maximum spot intensity point) is spaced from the Gaussian focal plane by about 10 μm, as indicated by a point C.

Figure 11:
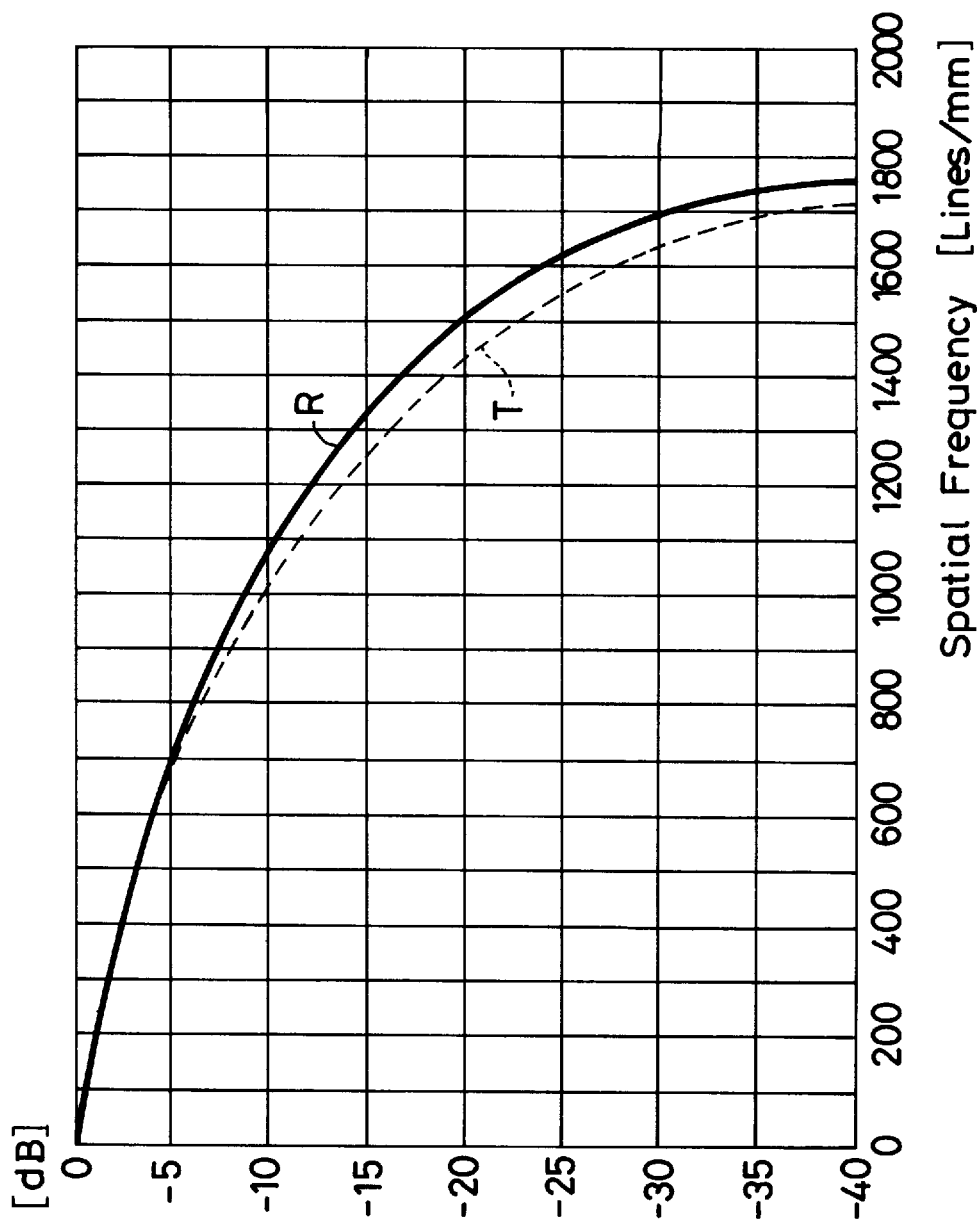
FIG. 11 is a diagram showing a modulation transfer function (MTF) with the optical pickup device shown in FIG. 6 used with a DVD.

Since the optical pickup device shown in FIG. 6 basically has components for use with a DVD, e.g., the LD 41, the grating 42, and so forth, when the optical pickup device shown in FIG. 6 is used with the DVD 20 as indicated by the point A, returning light has a sufficiently high intensity, as shown in FIG. 9, and almost no spherical aberration is produced, as shown in FIG. 10. A modulation transfer function (MTF) that represents the resolving power of the optical system is good for both the radial direction of the disc (indicated by the curve R in FIG. 11) and the tangential direction of the disc (indicated by the curve T in FIG. 11).

Figure 12:
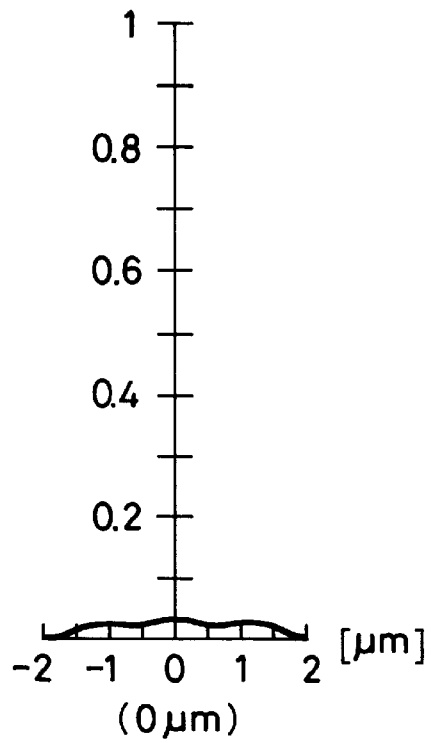
FIG. 12 is a diagram showing a distribution of intensities of returning light when the distance from the Gaussian focal plane is 0 μm with the optical pickup device shown in FIG. 6 used with a CD.
Figure 13:
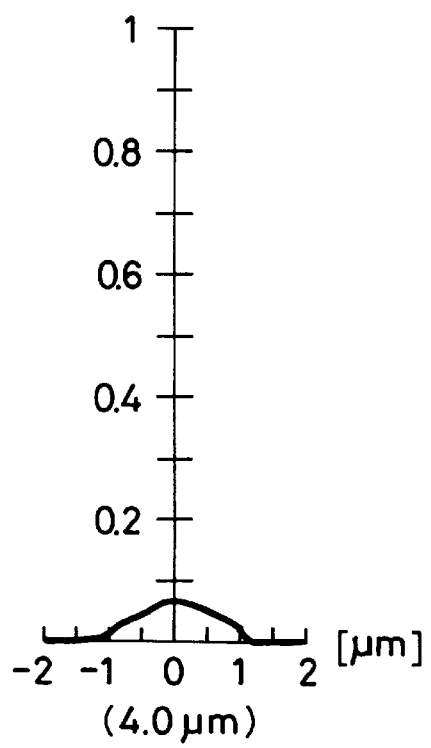
FIG. 13 is a diagram showing a distribution of intensities of returning light when the distance from the Gaussian focal plane is 4.0 μm with the optical pickup device shown in FIG. 6 used with a CD.
Figure 14:
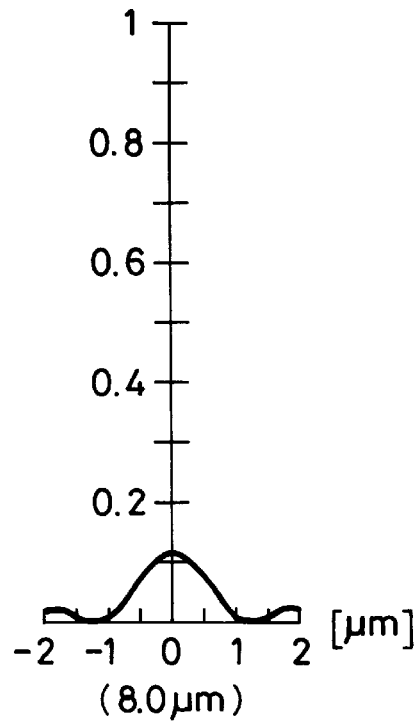
FIG. 14 is a diagram showing a distribution of intensities of returning light when the distance from the Gaussian focal plane is 8.0 μm with the optical pickup device shown in FIG. 6 used with a CD.

In the case of applying the optical pickup device for use with the DVD to the CD, the results of calculations of intensities of returning light at given points between the optical axis and the point where the wavefront aberration is minimum (the point B in FIG. 8) are shown in FIGS. 12 through 18. FIG. 12 shows a distribution of intensities of returning light at a point on the Gaussian focal plane, i.e., a point spaced from the Gaussian focal plane by 0 μm. If it is assumed that the intensity of returning light when the optical pickup device is used to read recorded information from a DVD is 1, then the intensities of returning light shown in FIG. 12 are only about 5% of the intensity 1 of returning light, and hence the recorded information cannot be read from the CD at this point.

Figure 18:
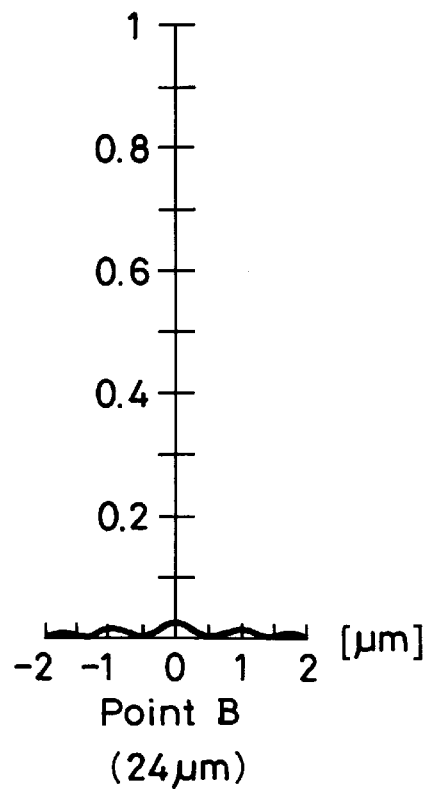
FIG. 18 is a diagram showing a distribution of intensities of returning light when the distance from the Gaussian focal plane is 24 μm with the optical pickup device shown in FIG. 6 used with a CD.

FIGS. 13 through 17 show respective distributions of intensities of returning light at points that are spaced from the Gaussian focal plane along the optical axis by respective distances 4.0 μm, 8.0 μm, 10 μm (the point C in FIG. 8), 12 μm, and 16 μm. FIG. 18 shows a distribution of intensities of returning light at a point spaced from the Gaussian focal plane by 24 μm (the point B in FIG. 8) where the wavefront aberration is minimum.

Figure 15:
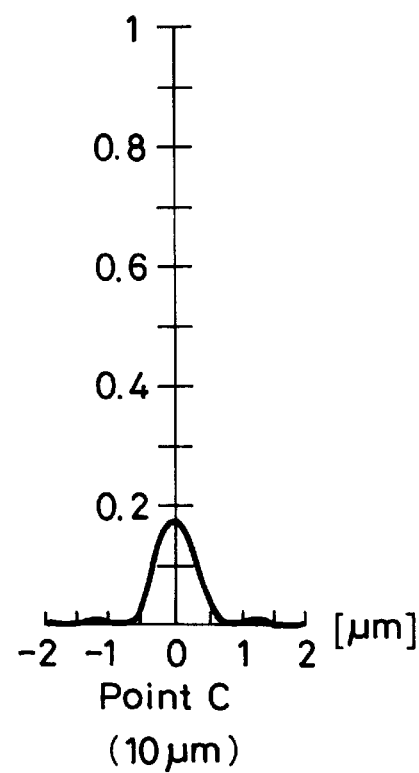
FIG. 15 is a diagram showing a distribution of intensities of returning light when the distance from the Gaussian focal plane is 10 μm with the optical pickup device shown in FIG. 6 used with a CD.
Figure 16:
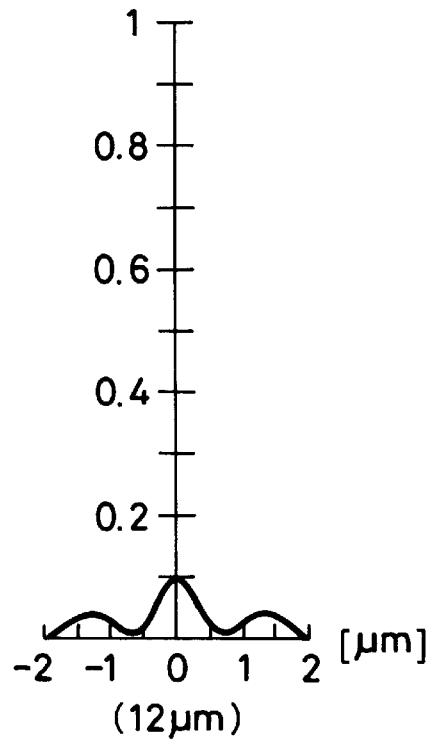
FIG. 16 is a diagram showing a distribution of intensities of returning light when the distance from the Gaussian focal plane is 12 μm with the optical pickup device shown in FIG. 6 used with a CD.
Figure 17:
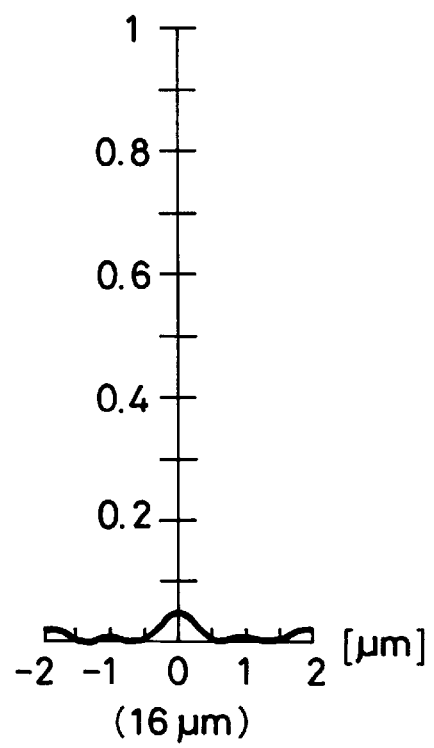
FIG. 17 is a diagram showing a distribution of intensities of returning light when the distance from the Gaussian focal plane is 16 μm with the optical pickup device shown in FIG. 6 used with a CD.

As can be understood from FIGS. 12 through 18, the point where the intensity of returning light is maximum is not the point where the wavefront aberration is minimum (the point B in FIG. 8), but the point which is spaced from the Gaussian focal plane along the optical axis by about 10 $\mu$m (the maximum spot intensity point, i.e., the point C in FIG. 8), as shown in FIG. 15. The intensity of returning light at this point is about 15% of the intensity of returning light that is produced when reading recorded information from a DVD. With this intensity of returning light, it is possible to read the recorded information from a CD at this point.

Figure 19:
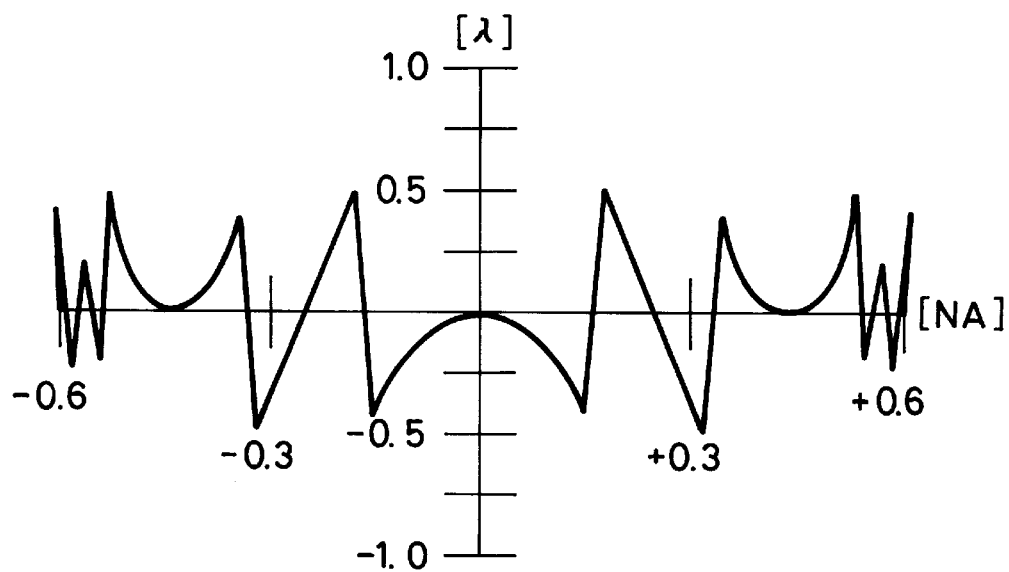
FIG. 19 is a diagram showing spherical aberration with the optical pickup device shown in FIG. 6 used with a CD.
Figure 20:
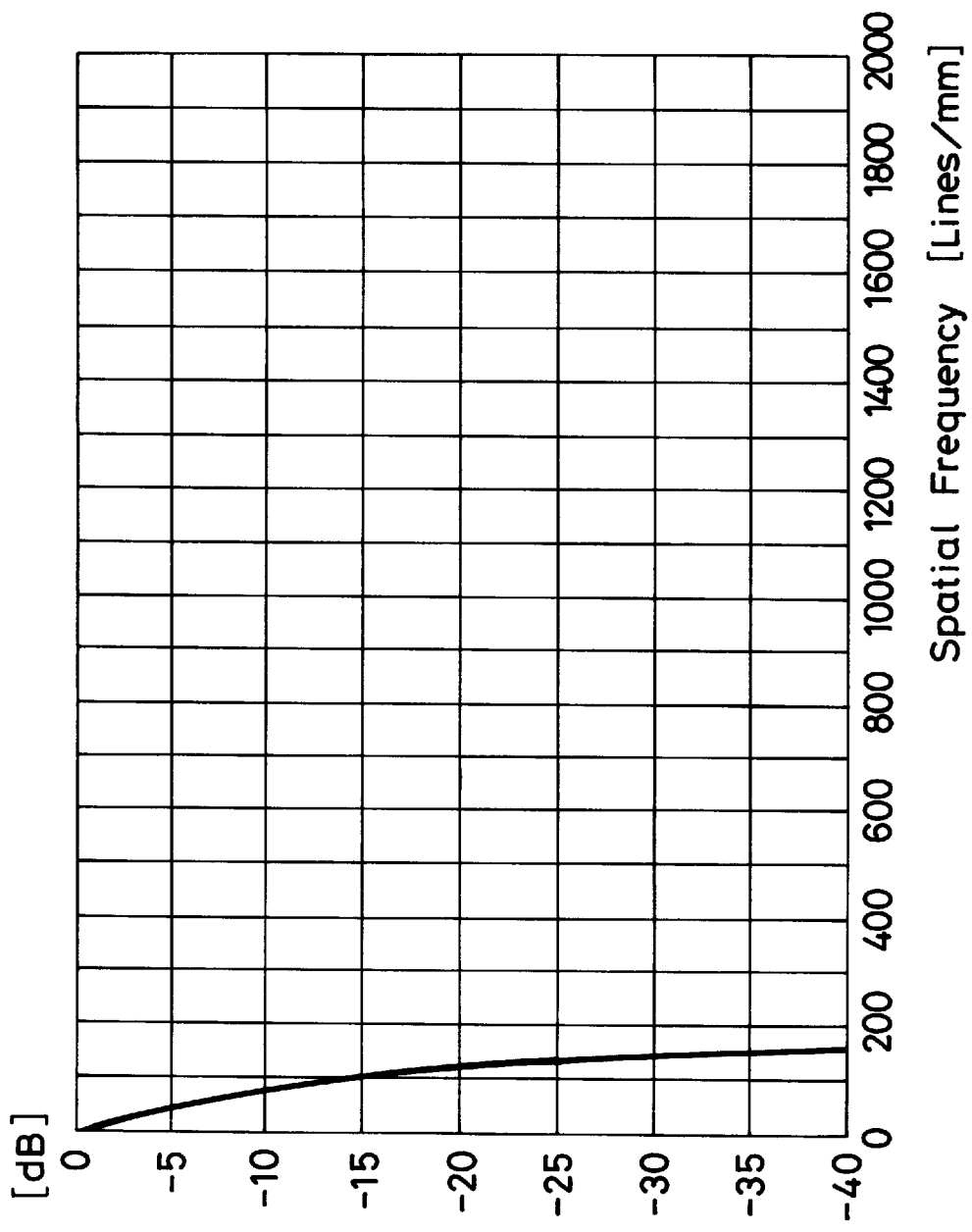
FIG. 20 is a diagram showing a modulation transfer function (MTF) with the optical pickup device shown in FIG. 6 used with a CD.

At the point B, the spherical aberration is appreciably large if the NA is about 0.15 or greater, as shown in FIG. 19, and the resolving power is low because a spatial frequency is 100 lines/mm, as indicated by an MTF in FIG. 20. Therefore, at the point B, it is difficult to read recorded information from the CD 10, which has approximately 2.5 tracks/mm.

Figure 22:
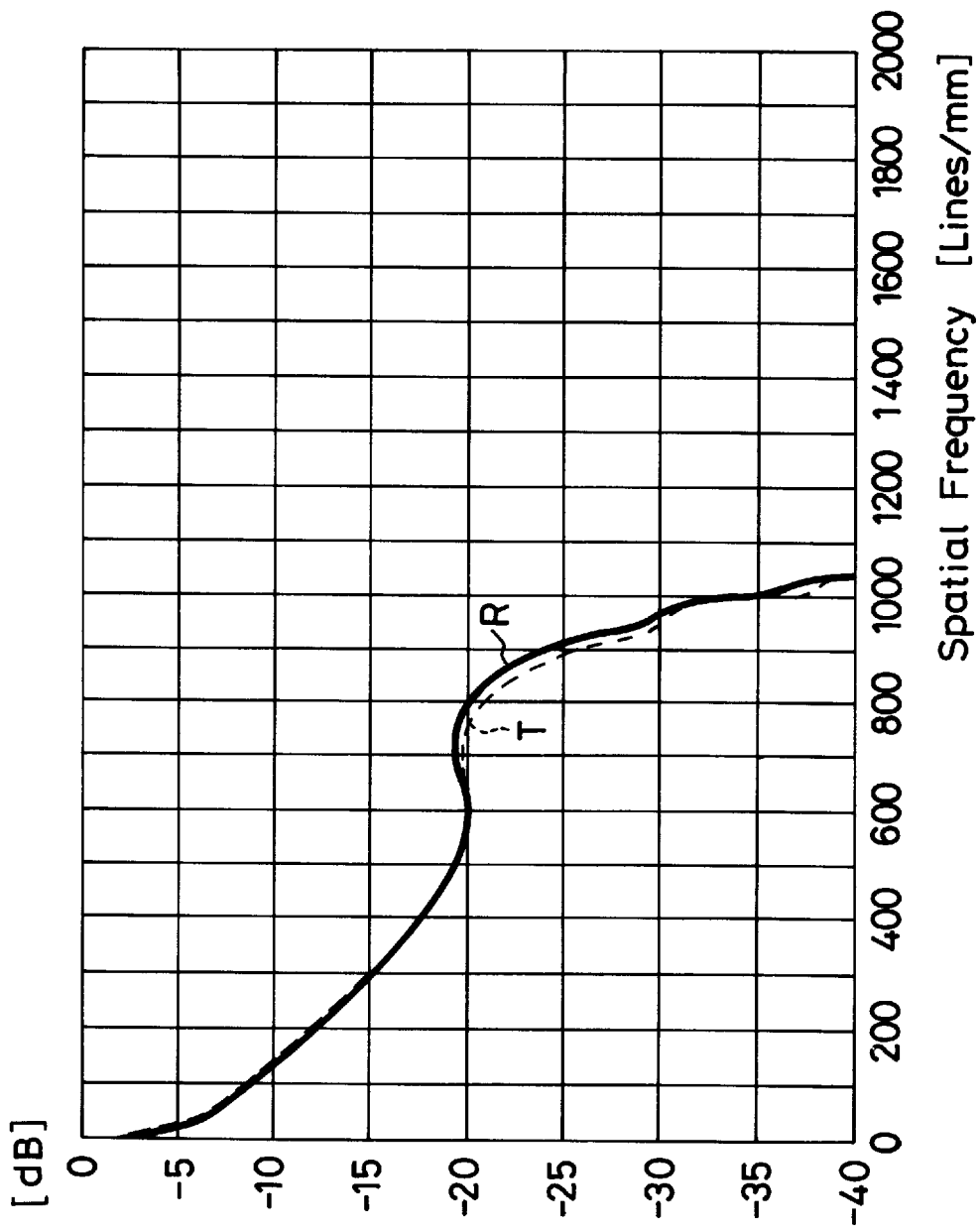
FIG. 22 is a diagram showing an MTF with the optical pickup device shown in FIG. 6 used with a CD.

At the maximum spot intensity point, i.e., the point C in FIG. 8, the spherical aberration is relatively small if the NA is in a range up to about 0.3, as shown in FIG. 21, and the resolving power is high because a spatial frequency is 1000 lines/mm in the radial direction of the disc (indicated by the curve R in FIG. 22) and in the tangential direction of the disc (indicated by the curve T in FIG. 22). Therefore, at the point C, it is possible to read recorded information from the CD 10.

Consequently, recorded information is read from the CD 10 by detecting returning light from the CD 10 within an NA range up to about 0.3 at the maximum spot intensity point.

Figure 23:
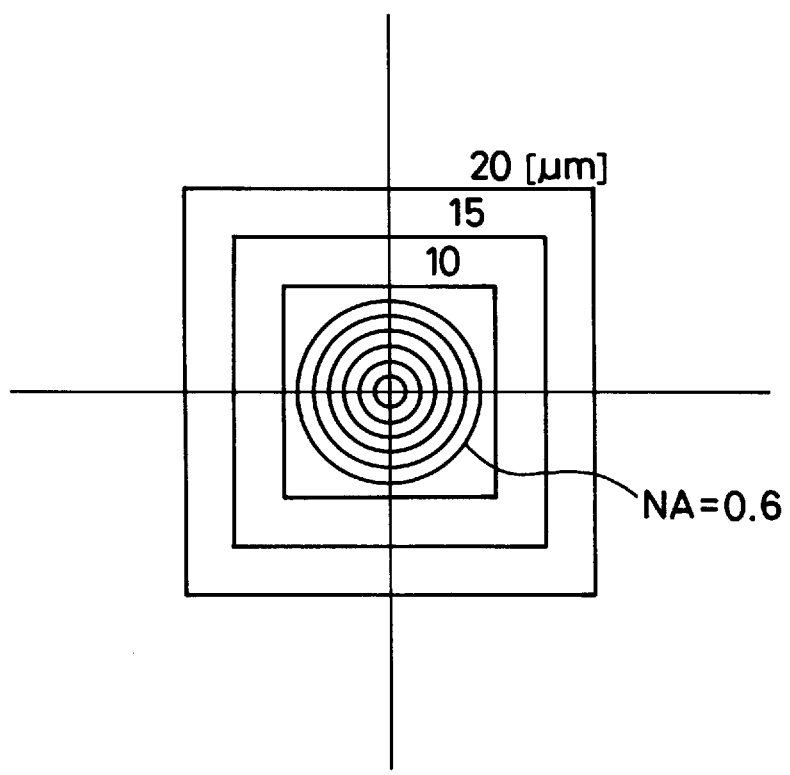
FIG. 23 is a view showing normalized photodetector sizes for the optical pickup device shown in FIG. 6.

FIG. 23 shows normalized detector sizes that are 10, 15, and 20 $\mu$m in terms of sides of square shapes. Each of the normalized detector sizes is calculated by dividing the length L of an actual detector (the photodetector units of the photodiode 61) by a magnification m of the objective 44 (L/m). Therefore, the actual dimensions of detectors are calculated by multiplying the normalized detector sizes by the magnification of the objective 44. For example, if the magnification of the objective 44 is 7.2, then the actual dimensions of the detectors are 72 (=10×7.2), 108 (15×7.2), and 144 (20×7.2) $\mu$m, respectively, in terms of sides of square shapes.

For reading recorded information from a DVD, the spot of returning light that is applied to the photodiode 61 for the NA=0.6 is represented by a largest circle of all concentric circles shown in FIG. 23. Therefore, for the photodiode 61 to read recorded information from a DVD, the normalized photodetector size therefor is required to be of a square shape with each side of 10 $\mu$m or greater.

Figure 24:
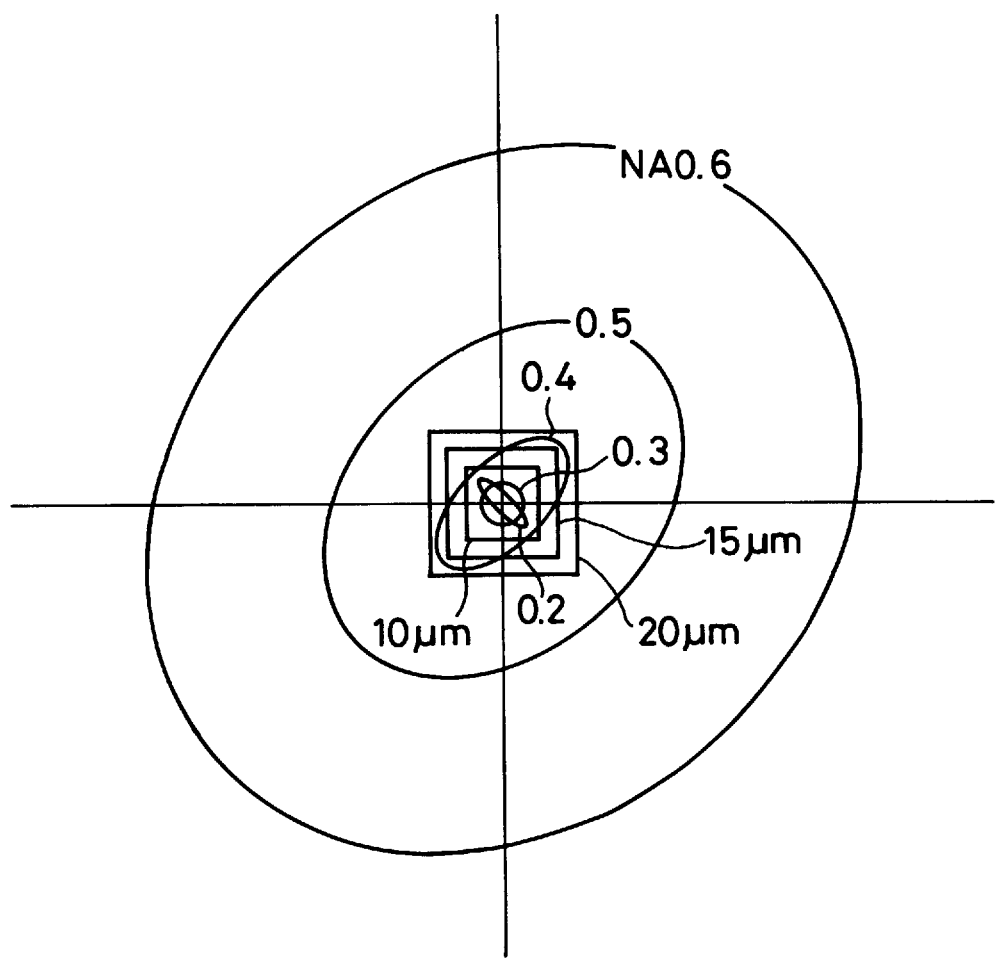
FIG. 24 is a view showing the relationship between normalized photodetector sizes and ranges of returning light.

FIG. 24 shows the relationship between the normalized detector sizes and ranges of returning light for respective NA values when reading recorded information from a CD. For detecting returning light at the maximum spot intensity point, it is necessary not to detect light of the NA of more than 0.3, i.e., light with large spherical aberration. As shown in FIG. 24, if the normalized detector size is 20 $\mu$m in terms of sides of a square shape, then it will detect light of the NA of 0.4 in its entirety. If the normalized detector size is 15 $\mu$m in terms of sides of a square shape (particularly if the normalized detector size of 20 $\mu$m is cut off at upper left and lower right corners), then it will not detect part of the light of the NA of 0.4. Therefore, the normalized detector size should preferably be 16 $\mu$m at maximum because at this size it will not detect light of the NA of 0.4 in its entirety.

Consequently, in order to read recorded information from a DVD and not to detect returning light of the NA in excess of 0.3 when reading recorded information from a CD, the normalized detector size should be in the range from 10 to 16 $\mu$m. The photodetector thus has a normalized detector size that is larger than a diameter of a spot on the photodetector of returning light of a first numerical aperture $N_1$ (0.6) from the DVD recording medium and smaller than a diameter of a spot on the photodetector of returning light of a numerical aperture greater than a second numerical aperture $N_2$ (0.3) from the CD recording medium.

Figure 25A:
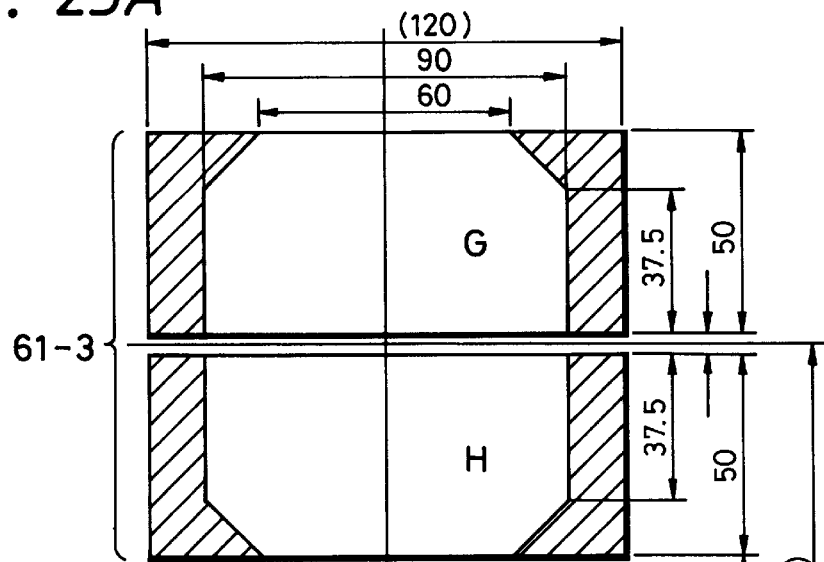
FIGS. 25A, 25B, and 25C are views of the structure of a photodiode in the optical pickup device shown in FIG. 6.
Figure 25B:
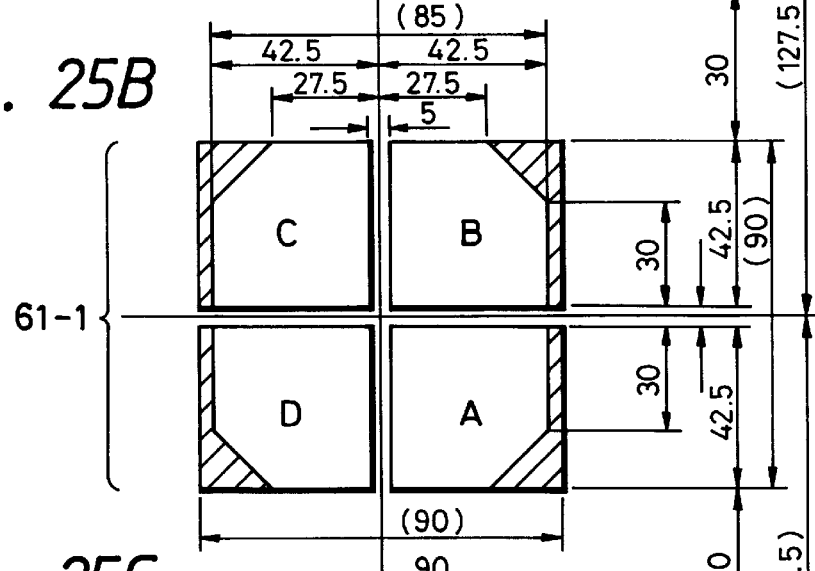
Figure 25C:
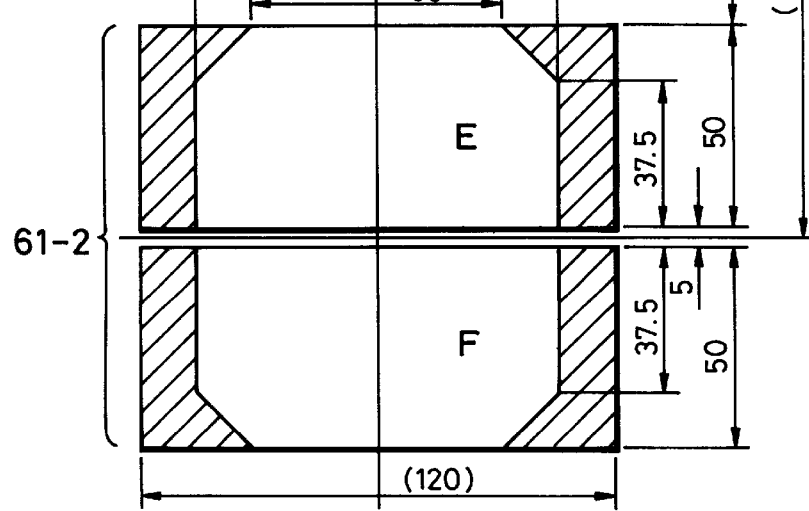

FIGS. 25A through 25C show specific configurations for the photodiode 61. As shown in FIGS. 25A through 25C, the photodiode 61 comprises photodetector units 61-1, 61-2, 61-3. The photodetector unit 61-1 is used to read recorded information and to control the objective 44 in focusing servo operation, and has dimensions of 90×85 $\mu$m (it can be converted into a normalized detector size of 12.5×11.8 $\mu$m because the magnification of the objective 44 is 7.2). The photodetector unit 61-1 is divided into four segments A, B, C, D because the focusing servo operation employs the astigmatic method.

Figure 26:
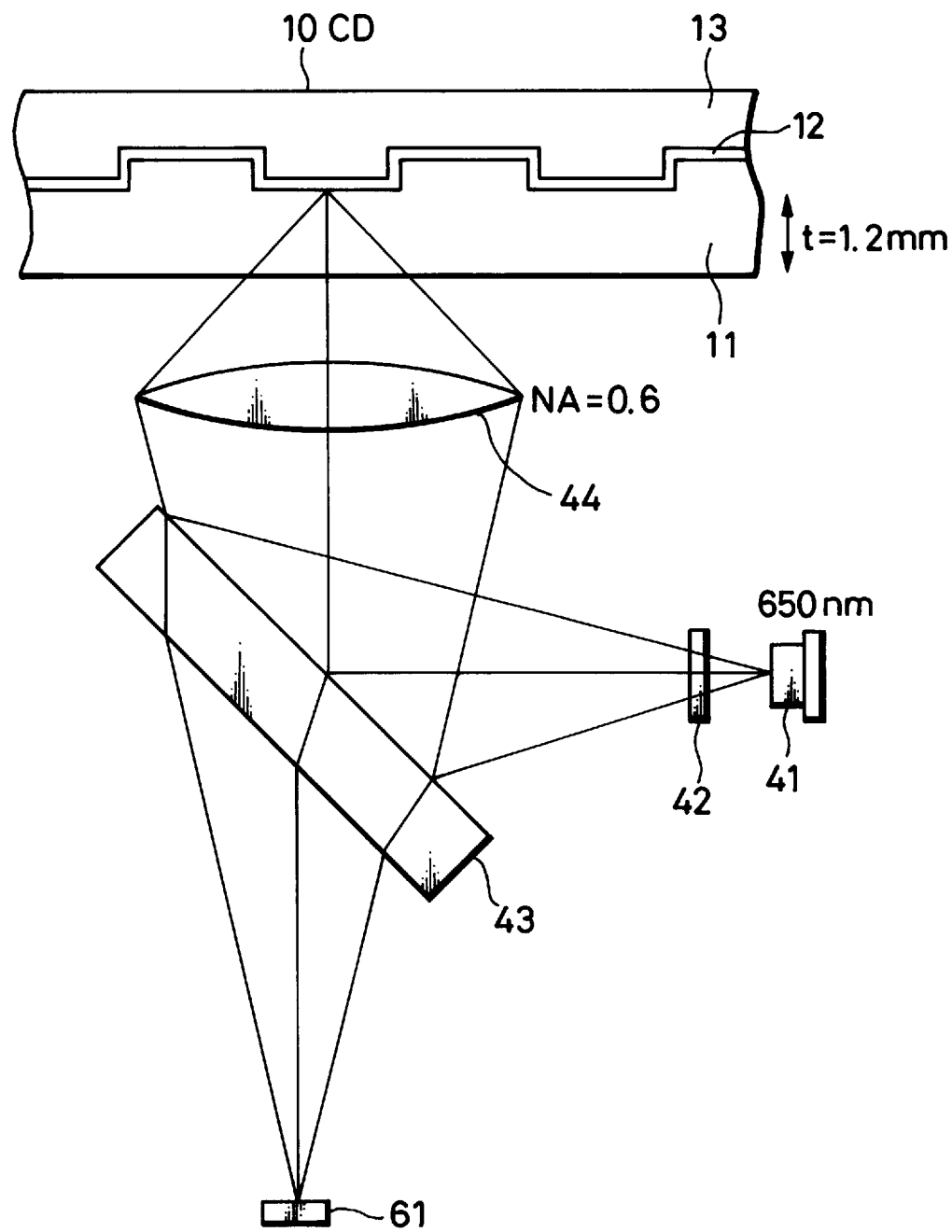
FIG. 26 is a cross-sectional view of the optical pickup device shown in FIG. 6 used with a CD.
Figure 27:
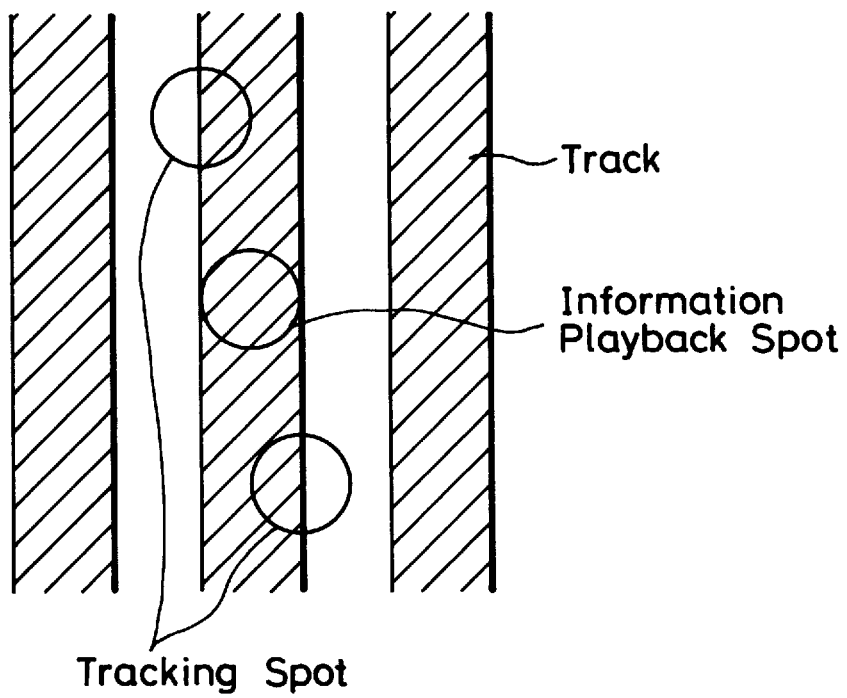
FIG. 27 is an enlarged view showing the positions of laser beam spots applied to a CD to read recorded information therefrom.

Inasmuch as the optical pickup device shown in FIG. 6 has the photodiode 61 that includes the photodetector unit 61-1 that is of a sufficiently small size of 12.5×11.8 $\mu$m for detecting returning light that is applied thereto in a given range (the NA is about 0.3), the optical pickup device used to read recorded information from a DVD is capable of reading recorded information from a CD, as shown in FIG. 26.

The photodetector units 61-2, 61-3 are used to control the objective 44 in so-called three-beam tracking servo operation. However, the photodetector units 61-2, 61-3 are divided into segments G, H and segments E, F, respectively, for making it possible to control the objective 44 also in differential push-pull tracking servo operation.

For reading recorded information from the CD 10, the objective 44 is controlled in the three-beam tracking servo operation in which tracking laser beam spots are positioned to irradiate radially inward and outward portions, respectively, of a track that is being read at present. The photodetector unit 61-2 detects returning light from the tracking laser beam spot on the radially inward portion, for example, of the track, and the photodetector unit 61-3 detects returning light from the tracking laser beam spot on the radially outward portion, for example, of the track.

When the track is properly followed by an information playback laser beam spot, i.e., when there is no tracking error, the two beams of returning light from the tracking laser beam spots have the same intensity. However, when the information playback laser beam spot is shifted radially outwardly from the track, i.e., when a tracking error occurs radially outwardly from the track, the tracking laser beam spot on the radially outward portion of the track has a reduced area overlapping the track, and hence the intensity of returning light reflected from the tracking laser beam spot on the radially outward portion of the track and applied to the photodetector unit 61-3 is increased (since the track has pits for diffracting light, the light reflected from the tracking laser beam spot that has a reduced area overlapping the track has an increased intensity). At the same time, the tracking laser beam spot on the radially inward portion of the track has an increased area overlapping the track, and hence the intensity of returning light reflected from the tracking laser beam spot on the radially inward portion of the track and applied to the photodetector unit 61-2 is reduced. Conversely, when the information playback laser beam spot is shifted radially inwardly from the track, i.e., when a tracking error occurs radially inwardly from the track, the intensities of returning light reflected from the tracking laser beam spots on the radially outward and inward portions of the track and applied to the photodetector units 61-3, 61-2 are reduced and increased, respectively.

The intensities of returning light reflected from the tracking laser beam spots on the radially inward and outward portions of the track, i.e., electric signals outputted from the respective photodetector units 61-2, 61-3, are compared with each other. If the intensity of returning light reflected from the tracking laser beam spot on the radially outward portion of the track is greater, then the information playback laser beam spot is shifted radially outwardly from the track. If the intensity of returning light reflected from the tracking laser beam spot on the radially inward portion of the track is greater, then the information playback laser beam spot is shifted radially inwardly from the track. Consequently, the direction and amount of a tracking error are known, allowing tracking adjustments to be made with respect to the objective.

Figure 28:
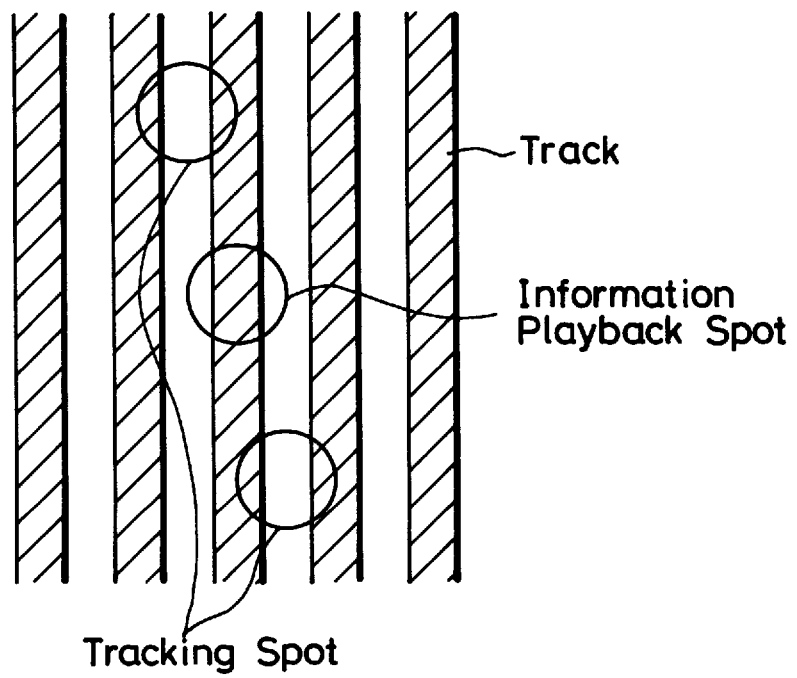
FIG. 28 is an enlarged view showing the positions of laser beam spots applied to a DVD to read recorded information therefrom.

If the objective 44 is to be controlled in the three-beam tracking servo operation for reading recorded information from the DVD 20, then since the intervals between the three laser beams are fixed at intervals for reading recorded information from a CD, i.e., intervals corresponding to a track pitch of the CD 10, and the track pitch of the DVD 20 is smaller than the track pitch of the CD 10, the laser beam spots of the three laser beams are not properly positioned with respect to tracks on the DVD 20, as shown in FIG. 28. As a result, it is difficult to effect correct tracking control on the objective 44.

According to the present invention, the objective 44 is controlled in the differential push-pull tracking servo operation for reading recorded information from the DVD 20. If a tracking error occurs, then the quantities of light applied to left and right regions of each of the photodetector units 61-1, 61-2, 61-3 across the track are varied. In the differential push-pull tracking servo operation, the quantities of light applied to left and right regions are compared with each other, and the tracking error is detected based on the difference between the compared quantities of light.

Figure 29:
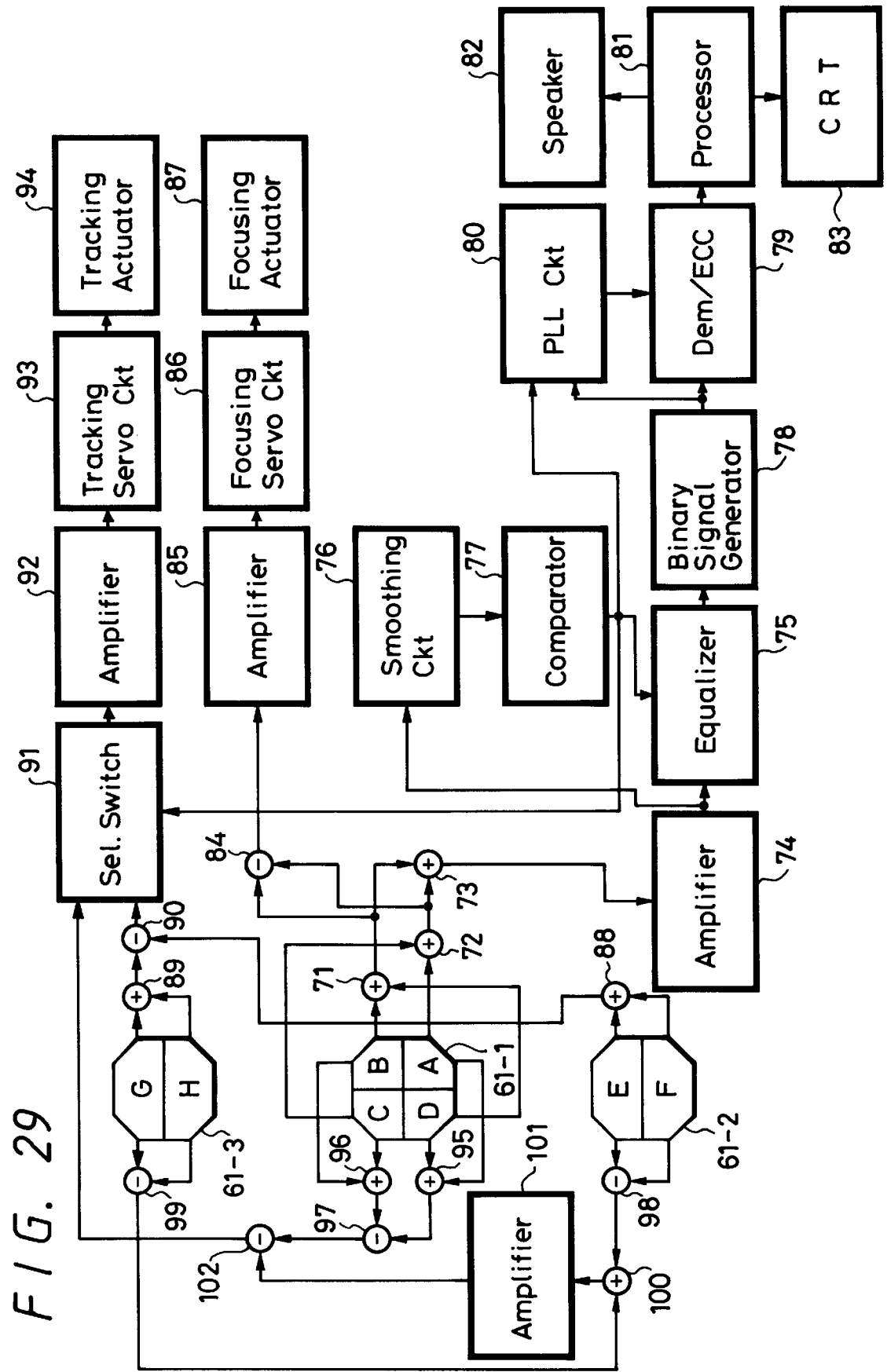
FIG. 29 is a block diagram of an electric arrangement of the apparatus for recording information on or reproducing information from a recording medium according to the present invention.

FIG. 29 shows an electric arrangement of the apparatus for recording information on or reproducing information from a recording medium according to the present invention. In FIG. 29, the photodetector unit 61-1 of the photodiode 61 is used mainly to read recorded information and also to control the objective 44 in focusing servo operation, though it is partly used to control the objective 44 in tracking servo operation. The photodetector unit 61-1 is divided into four segments A, B, C, D each for converting detected light into an electric signal.

The segment A is connected to adders 72, 95 for outputting an electric signal thereto, and the segment B is connected to adders 71, 96 for outputting an electric signal thereto. The segment C is connected to the adders 72, 96 for outputting an electric signal thereto, and the segment D is connected to the adders 71, 95 for outputting an electric signal thereto.

The photodetector units 61-2, 61-3 are used to control the objective 44 in tracking servo operation. The photodetector unit 61-2 is divided into segments E, F each for converting detected light into an electric signal. The segments E, F are connected to an adder 88 and a subtractor 98 for outputting respective electric signals thereto. The photodetector unit 61-3 is divided into segments G, H each for converting detected light into an electric signal. The segments G, H are connected to an adder 89 and a subtractor 99 for outputting respective electric signals thereto.

The adder 71 calculates the sum of the electric signals outputted from the respective segments B, D of the photodetector unit 61-1, and outputs a sum signal to an adder 73. The adder 72 calculates the sum of the electric signals outputted from the respective segments A, C of the photodetector unit 61-1, and outputs a sum signal to the adder 73.

The adder 73 calculates the sum of the signals from the adders 71, 72, i.e., the sum of the electric signals outputted from the segments A, B, C, D, and outputs a sum signal through an amplifier 74 to an equalizer 75 (equalizing means) and a smoothing circuit 76.

The equalizer 75 processes the electric signal detected by the photodetector unit 61-1 as being read from the recording medium to emphasize high-frequency components thereof compared with low-frequency components thereof according to predetermined equalizing characteristics, and outputs the processed signal to a binary signal generator 78. The equalizer 75 can change its equalizing characteristics depending on an output signal from a comparator 77 (decision means) that represents the determined type of the recording medium being read. Since the DVD 20 stores information recorded at a higher density than the CD 10, the equalizer 75 emphasizes signal components of higher frequencies when the DVD 20 is played back than when the CD 10 is played back.

The smoothing circuit 76 smooths the supplied signal and outputs the smoothed signal to the comparator 77.

The comparator 77 stores, as a reference value, a value that is twice the output voltage produced by the smoothing circuit 76 when a CD is read, i.e., a value intermediate between the level of the output signal produced by the smoothing circuit 76 when a CD is read and the level of the output signal produced by the smoothing circuit 76 when a DVD is read. The comparator 77 compares the output signal from the smoothing circuit 76 (the output voltage produced by the smoothing circuit 76 when a DVD is read is about three times the output voltage produced by the smoothing circuit 76 when a CD is read) with the reference value for thereby determining the type of the recording medium. The comparator 77 then outputs a signal representing the determined type of the recording medium to the equalizer 75, a PLL (phase-locked loop) 80, and a selector switch 91.

The binary signal generator 78 asymmetrically corrects the equalized signal outputted from the equalizer 75, converts the corrected signal into a binary signal, and outputs the binary signal to a demodulator/ECC circuit 79 and the PLL 80.

The demodulator/ECC circuit 79 corrects errors contained in the supplied signal, demodulates binary data according to a clock signal supplied from the PLL 80, and outputs a video signal and an audio signal (only an audio signal when a CD is played back) to a processor 81.

The PLL 80 generates a clock signal from the signal supplied from the binary signal generator 78 and outputs the clock signal to the demodulator/ECC circuit 79. Since clock frequencies used to demodulate the binary data from the DVD 20 and the CD 10 are different from each other, the PLL 80 supplies a clock signal having a frequency corresponding to the type of the recording medium depending on the output signal from the comparator 77 to the demodulator/ECC circuit 79.

When supplied with both the video signal and the audio signal from the demodulator/ECC circuit 79, the processor 81 outputs the audio signal to a speaker 82, and outputs the video signal to a CRT 83. When supplied with only the audio signal from the demodulator/ECC circuit 79, the processor 81 outputs the audio signal to the speaker 82.

A subtractor 84 calculates the difference between the sum, outputted from the adder 71, of the output signals from the segments B, D of the photodetector unit 61-1 and the sum, outputted from the adder 72, of the output signals from the segments A, C of the photodetector unit 61-1, i.e., the subtractor 84 calculates (b+d)−(a+c) where a, b, c, d represent the output signals from the respective segments A, B, C, d, and outputs the calculated difference as a focusing error signal through an amplifier 85 to a focusing servo circuit 86.

In response to the supplied focusing error signal, the focusing servo circuit 86 controls a focus actuator 87 to move the objective 44 along the optical axis for making the light spot on the photodetector unit 61-1 circular.

The adders 88, 89 calculate the sums of the electric signals outputted from the respective photodetector units 61-2, 61-3, and output sum signals to a subtractor 90. The subtractor 90 calculates the difference between the output signals from the adders 88, 89, and outputs a differential signal as a tracking error signal at the time a CD is read to the selector switch 91.

At this time, the tracking error signal (three-beam tracking error signal) outputted to the selector switch 91 is expressed by (e+f)−(g+h) where e, f, g, h represent respective electric signals corresponding to the quantities of light detected by the segments E, F, G, H.

The subtractors 98, 99 calculate the differences between the electric signals outputted from the respective photodetector units 61-2, 61-3, and output differential signals to an adder 100. The adder 100 calculates the sum of the differential signals, and outputs a sum signal through an amplifier 101 to a subtractor 102.

The amplifier 101 amplifies the signal supplied from the adder 100 by a predetermined factor K, and outputs an amplified signal to the subtractor 102.

The adder 95 calculates the sum of the electric signals outputted from the segments A, D of the photodetector unit 61-1, and outputs a sum signal to a subtractor 97. The adder 96 calculates the sum of the electric signals outputted from the segments B, C of the photodetector unit 61-1, and outputs a sum signal to the subtractor 97. The subtractor 97 calculates the difference between the output signals from the adders 96, 97, and outputs a differential signal to the subtractor 102.

The subtractor 102 calculates the difference between the signal from the amplifier 101 and the signal from the subtractor 97, and outputs a differential signal as a tracking error signal (a differential push-pull tracking error signal) at the time a DVD is read to the selector switch 91.

If it is assumed that the electric signals outputted from the segments A, B, C, D, E, F, G, H are represented by a, b, c, d, e, f, g, h, respectively, and the amplifier 101 has an amplification factor K, then the tracking error signal outputted to the selector switch 91 is represented by (b+c)−(a+d)−K{(e−f) + (g−h)}.

If the recording medium currently being played back is the CD 10, as indicated by the output signal from the comparator 77, then the selector switch 91 selects the output signal, i.e., the three-beam tracking error signal, from the subtractor 90, and supplies the selected three-beam tracking error signal through an amplifier 92 to a tracking servo circuit 93 (control means). If the recording medium currently being played back is the DVD 20 as indicated by the output signal from the comparator 77, then the selector switch 91 selects the output signal, i.e., the differential push-pull tracking error signal, from the subtractor 102, and supplies the selected differential push-pull tracking error signal through the amplifier 92 to the tracking servo circuit 93.

In response to the supplied tracking error signal, the tracking servo circuit 93 controls a tracking actuator 94 to move the objective 44 in a direction perpendicular to the track to apply the laser beam on the track of the information recording layer.

A process of determining the type of the recording medium being played back by the apparatus shown in FIG. 29 will be described below.

First, returning light of the laser beam that has read recorded information from the recording medium is detected by the four segments A through D of the photodetector unit 61-1, and converted thereby into respective electric signals a, b, c, d. The electric signals are then added into a sum signal (a+b+c+d) by the adders 71 through 73. The sum signal (a+b+c+d), which represents the intensity of the returning light, is supplied through the amplifier 74 to the smoothing circuit 76.

The smoothing circuit 76 smooths the supplied signal and outputs the smoothed signal to the comparator 77. The level of the smoothed signal that is produced when a DVD is read is about three times the level of the smoothed signal that is produced when a CD is read. Therefore, the comparator 77 compares the smoothed signal with a predetermined reference value, i.e., a value intermediate between the level of the smoothed signal produced when a CD is read and the level of the smoothed signal produced when a DVD is read. If the recording medium currently being read is the DVD 20, then the comparator 77 outputs a positive signal, for example, and if the recording medium currently being read is the CD 10, then the comparator 77 outputs a negative signal, for example.

A focusing servo process carried out by the apparatus shown in FIG. 29 will be described below.

The four segments A through D of the photodetector unit 61-1 convert returning light that is detected into respective electric signals a, b, c, d. The adder 71 calculates the sum (b+d) of the electric signals outputted from the respective segments B, D, and the adder 72 calculates the sum (a+c) of the electric signals outputted from the respective segments A, C. The subtractor 84 then calculates the difference ((b+d)−(a+c)) between the sums (b+d) and (a+c). The differential signal from the subtractor 84 is supplied as a focusing error signal through the amplifier 85 to the focusing servo circuit 86.

When the spot of the returning light applied to the photodetector unit 61-1 is of a circular shape, the focusing error signal supplied to the focusing servo circuit 86 is of a zero level. When the spot of the returning light applied to the photodetector unit 61-1 is of an elliptical shape whose major axis is directed through the segments B, D, the focusing error signal supplied to the focusing servo circuit 86 is of a certain positive level. When the spot of the returning light applied to the photodetector unit 61-1 is of an elliptical shape whose major axis is directed through the segments A, C, the focusing error signal supplied to the focusing servo circuit 86 is of a certain negative level.

Depending on the sign and level of the focusing error signal, the focusing servo circuit 86 controls the focus actuator 87 to move the objective 44 along the optical axis to make the spot of returning light on the photodetector unit 61-1 circular.

As described above, based on the principles of the astigmatic method, the quantity of light detected by the segments B, D of the photodetector unit 61-1, and the quantity of light detected by the segments A, C of the photodetector unit 61-1, are compared with each other to determine the direction and magnitude of a focusing error, and the objective 44 is moved depending on the determined direction and magnitude of the focusing error under focusing servo control.

A tracking servo process carried out by the apparatus shown in FIG. 29 will be described below.

The photodetector units 61-2, 61-3 converts the quantities of returning light detected by the segments E, F and G, H into respective electric signals e, f and g, h, and outputs the electric signals e, f and g, h to the respective adders 88, 89. The adders 88, 89 supply respective sum signals (e+f) and (g+h) to the subtractor 90, which calculates the difference ((e+f)−(g+h)) between these sum signals (e+f) and (g+h), and outputs the differential signal as a three-beam tracking error signal to the selector switch 91.

The subtractors 98, 99 calculate the differences (e−f) and (g−h) between the quantities of returning light detected by the segments E, F and G, H.

The segments B, C of the photodetector unit 61-1 output respective electric signals b, c converted from the quantities of returning light detected thereby to the adder 96, and the segments A, D of the photodetector unit 61-1 output respective electric signals a, d converted from the quantities of light detected thereby to the adder 95. These adders 95, 96 calculate the sums (b+c) and (a+d) of the electric signals from the segments B, C and A, D, and output the sum signals to the subtractor 97.

The subtractor 97 calculates the difference ((b+c) − (a+d)) between the sum (b+c) of the electric signals from the segments B, C and the sum (a+d) of the electric signals from the segments A, D, and outputs the differential signal to the subtractor 102.

The subtractor 98 calculates the difference (e−f) between the electric signal e converted from the quantity of returning light detected by the segment E of the photodetector unit 61-2 and the electric signal f converted from the quantity of returning light detected by the segment F of the photodetector unit 61-2, and outputs the differential signal to the adder 100. The subtractor 99 calculates the difference (g−h) between the electric signal g converted from the quantity of returning light detected by the segment G of the photodetector unit 61-3 and the electric signal g converted from the quantity of returning light detected by the segment H of the photodetector unit 61-3, and outputs the differential signal to the adder 100. The adder 100 calculates the sum ((e−f) + (g−h)) of the supplied differential signals, and outputs the sum signal to the amplifier 101.

The amplifier 101 amplifies the supplied sum signal by the amplification factor K, and outputs the amplified signal (K((e−f) + (g−h))) to the subtractor 102.

The subtractor 102 calculates the difference (((b+c) − (a+d)) − K((e−f) + (g−h))) between the output signal ((b+c) − (a+d)) from the subtractor 97 and the output signal (K((e−f) + (g−h))) from the amplifier 101, and outputs the differential signal as a differential push-pull tracking error signal to the selector switch 91.

As described above, the selector switch 91 is supplied with the output signal from the comparator 77. If the output signal from the comparator 77 is positive, indicating that the recording medium is a DVD, then the selector switch 91 selects the differential push-pull tracking error signal from the subtractor 102, and supplies the selected differential push-pull tracking error signal through the amplifier 92 to the tracking servo circuit 93.

If the output signal from the comparator 77 is negative, indicating that the recording medium is a CD, then the selector switch 91 selects the three-beam tracking error signal from the subtractor 90, and supplies the selected three-beam tracking error signal through the amplifier 92 to the tracking servo circuit 93.

In response to the supplied tracking error signal, the tracking servo circuit 93 controls the tracking actuator 94 to move the objective 44 into a proper position perpendicular to the track.

The objective 44 is thus controlled in the tracking servo process to apply the laser beam to the desired track at all times to thereby obtain appropriate returning light.

A process of reading recorded information from the recording medium will be described below.

Returning light representing read recorded information is detected by the four segments A through D of the photodetector 61-1, which convert the returning light into respective electric signals a, b, c, d. The adders 71 through 73 calculate the sum (a+b+c+d) of the electric signals a, b, c, d, and supply the sum signal as representing the intensity of the returning light through the amplifier 74 to the equalizer 75.

Based on the output signal from the comparator 77, the equalizer 75 equalizes the signal supplied from the amplifier 74 with equalizing characteristics corresponding to the recording medium being played back. Then, the equalizer 75 outputs the equalized signal to the binary signal generator 78. The binary signal generator 78 corrects the signal and converts the corrected signal into a binary signal, which is outputted to the demodulator/ECC circuit 79 and the PLL 80.

The PLL 80 generates a clock signal from the signal supplied from the binary signal generator 78 depending on the type of the recording medium based on the output signal from the comparator 77, and outputs the clock signal to the demodulator/ECC circuit 79. The demodulator/ECC circuit 79 corrects errors contained in the supplied signal, and demodulates binary data according to the clock signal supplied from the PLL 80. If the recording medium is a CD, then the demodulator/ECC circuit 79 outputs a demodulated audio signal to the processor 81. If the recording medium is a DVD, then the demodulator/ECC circuit 79 outputs demodulated video and audio signals to the processor 81.

The processor 81 outputs the audio signal to the speaker 82, and, if supplied with the video signal, also outputs the video signal to the CRT 83.

As described above, recorded information from a CD or a DVD is read, equalized, corrected, demodulated, and then outputted to the speaker 82 and the CRT 83 for reproduction.

In this manner, recorded information is read selectively from the CD 10 or the DVD 20 while under focus and tracking servo control to reproduce video and audio signals.

The photodetector unit 61-1 is shown as being of a substantially octagonal shape in FIG. 25B. However, the photodetector unit 61-1 may be of a square shape as shown in FIG. 30A. Alternatively, in order not to detect unwanted light, i.e., light of the NA of 0.4, as shown in FIG. 24, the photodetector unit 61-1 may be of a hexagonal shape produced by cutting off two opposite corners of a square shape, as shown in FIG. 30B, or may be of a circular shape, as shown in FIG. 30C.

Figure 31:
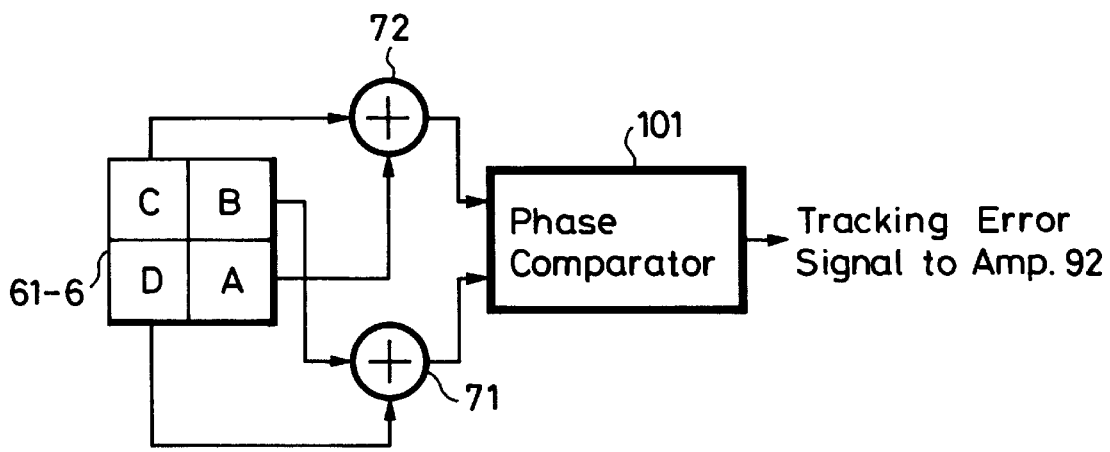
FIG. 31 is a block diagram of an arrangement for generating a tracking error signal according to a differential phase detection method.

In the apparatus shown in FIG. 29, the tracking servo process is based on the three-beam tracking servo method or the differential push-pull tracking servo method. However, the tracking servo process may be carried out according to the differential phase detection (DPD) method. According to the differential phase detection method, as shown in FIG. 31, the electric signals outputted from the segments A, C of the photodetector unit 61-1 are added by the adder 72, and the electric signals outputted from the segments B, D of the photodetector unit 61-1 are added by the adder 71. Then, the sum signals outputted from the adders 71, 72 are compared in phase with each other by a phase comparator 101, which produces a phase error signal as a tracking error signal.

According to the differential phase detection method, since a tracking error signal can be generated only from the returning light reflected from the information playback laser beam spot, the tracking spots, and hence the photodetector units 61-2, 61-3, and the selector switch 91 may be dispensed with. Therefore, the output signal from the phase comparator 101 may be outputted directly to the amplifier 92.

The principles of generation of a tracking error signal according to the differential phase detection method are disclosed in Japanese patent publication No. 5-800535, for example.

If a tracking error signal is generated according to the differential phase detection method and a focusing error signal is generated according to the astigmatic method, then recorded information may be reproduced from both the CD 10 and the DVD 20, and the tracking servo and the focusing servo processes may be carried out, using only the output signals from the photodetector unit 61-1.

For actually reproducing recorded information from the CD 10 and the DVD 20, it is necessary to detect reflected light suffering small aberration and having a level greater than a predetermined level, and also to take other conditions into account.

Figure 32:
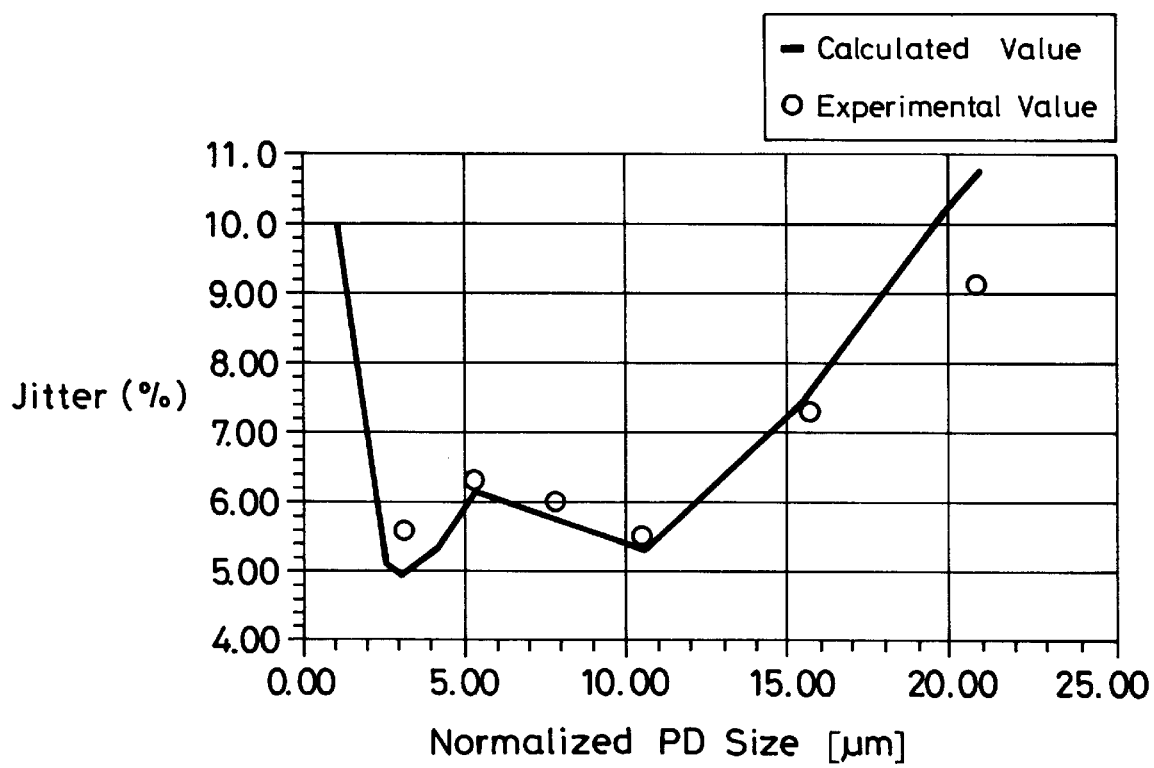
FIG. 32 is a diagram showing how jitter varies when the normalized detector size varies upon playing back a CD.

For example, as shown in FIG. 32, when a CD is played back, jitter varies as the normalized detector size varies.

FIG. 32 shows how jitter varies when the normalized detector size varies while the focusing servo process is carried out according to the astigmatic method and the tracking servo process is carried out according to the differential phase detection method. In FIG. 32, the solid-line curve represents calculated values produced by a computer simulation process, and the circular dots represent experimental values.

As shown in FIG. 32, if the normalized detector size is too large, since the photodetector unit detects light containing much aberration (light of a large NA), jitter will increase.

If the normalized detector size is too small, it will be difficult to keep a spot of reflected light in a given position on the photodetector unit due to requirements for the tracking servo control and the focusing servo control and also the attachment accuracy. As a consequence, the photodetector unit is unable to detect a sufficient quantity of returning light, resulting in increased jitter.

If jitter increases in excess of 8%, then recorded information cannot substantially be reproduced from the recording medium. Therefore, jitter should preferably be reduced to 8% or less. In order to lower jitter to 8% or less, the normalized detector size should be at most about 16 $\mu$m and at least about 1.8 $\mu$m.

In order to lower jitter to 7% or less, the normalized detector size should be at most about 14 $\mu$m and at least about 2 $\mu$m.

However, as shown in FIG. 32, if the normalized detector size is nearly 2 $\mu$m, jitter increases sharply even if the normalized detector size suffers slight variations. From the practical standpoint, therefore, the normalized detector size should preferably be at least 4 $\mu$m.

An RF signal, i.e., the sum of the electric signals outputted from the segments A through D of the photodetector unit 61-1 shown in FIG. 29, and the focusing error signal according to the astigmatic method vary as the normalized detector size varies, as simulated in FIGS. 33 through 38.

Figure 35:
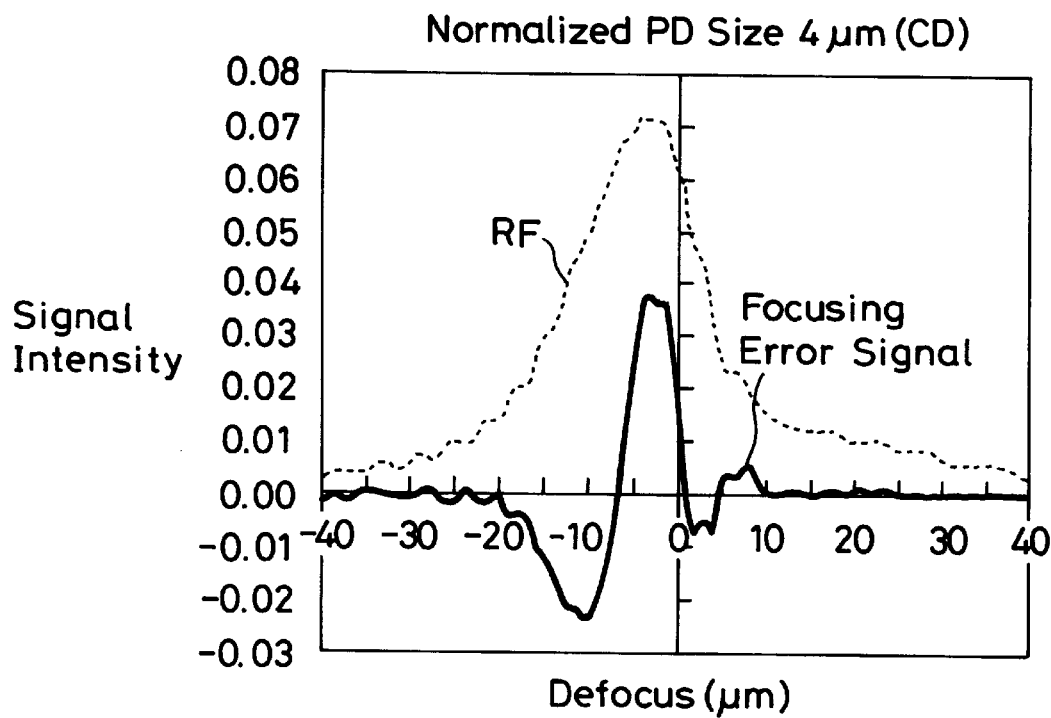
FIG. 35 is a diagram showing the characteristics of a focusing error signal and an RF signal upon playing back a CD with a normalized detector size of 4 μm.
Figure 36:
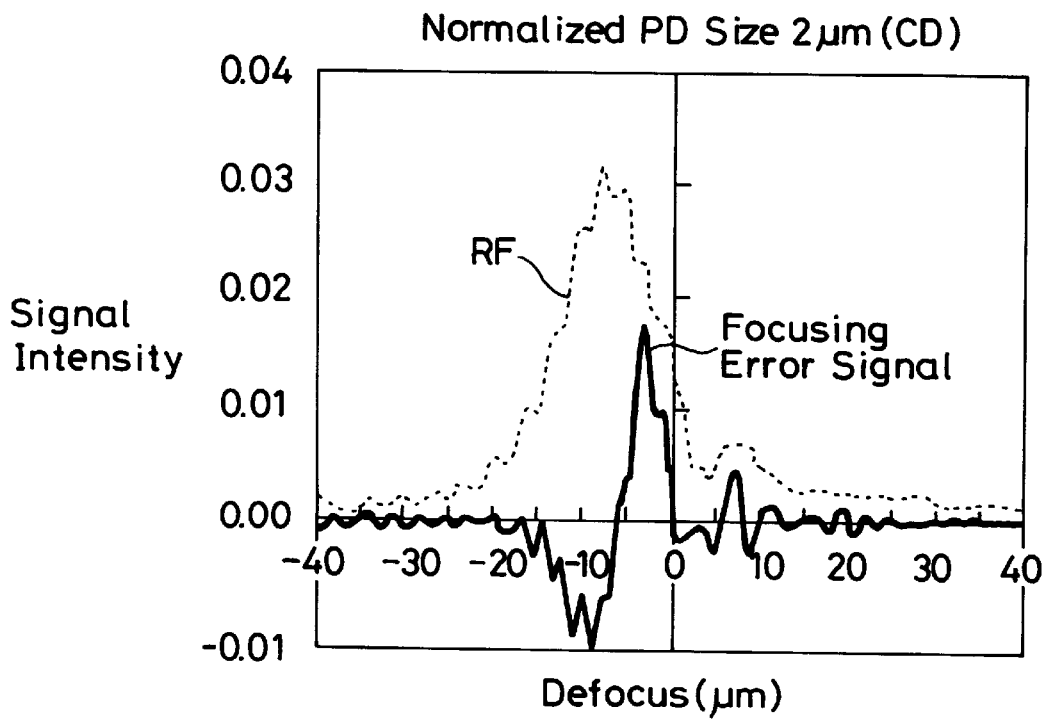
FIG. 36 is a diagram showing the characteristics of a focusing error signal and an RF signal upon playing back a CD with a normalized detector size of 2 μm.
Figure 37:
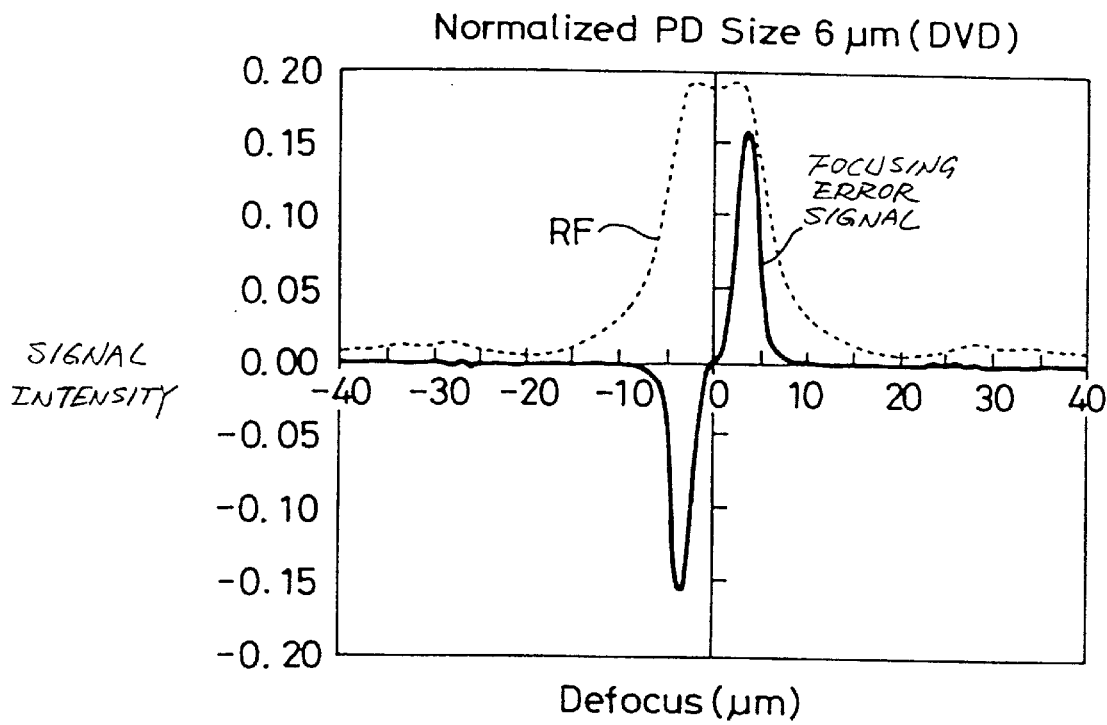
FIG. 37 is a diagram showing the characteristics of a focusing error signal and an RF signal upon playing back a DVD with a normalized detector size of 6 μm.
Figure 38:
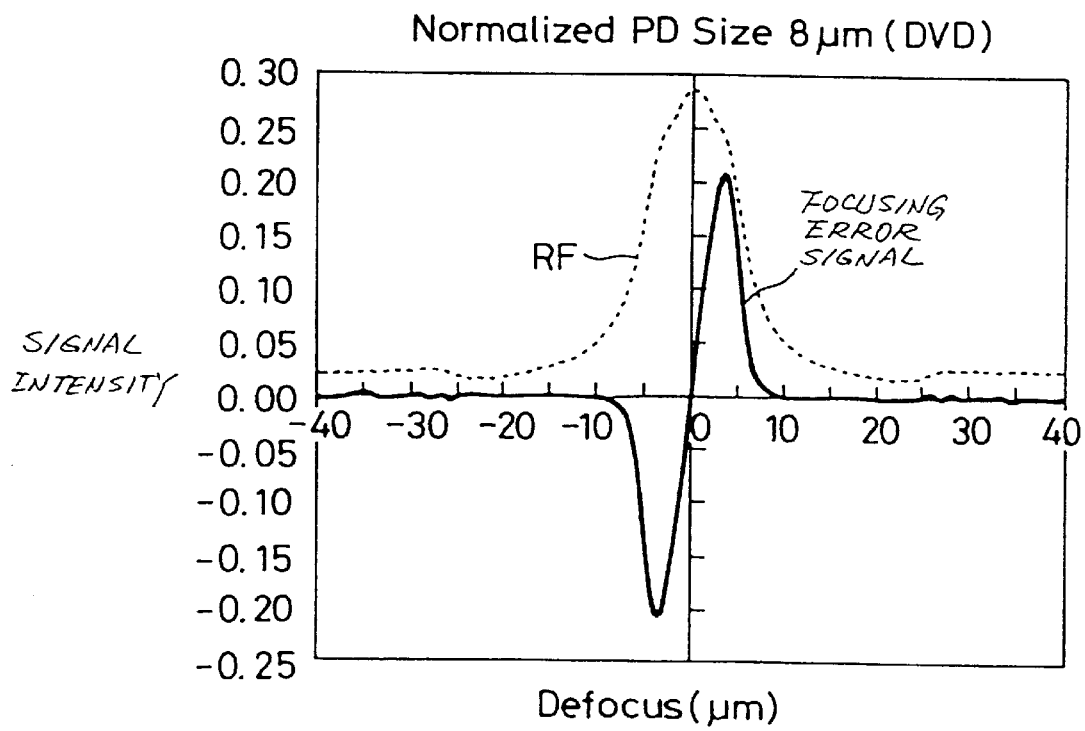
FIG. 38 is a diagram showing the characteristics of a focusing error signal and an RF signal upon playing back a DVD with a normalized detector size of 8 μm.

FIGS. 33 through 36 show how the RF signal and the focusing error signal vary when a CD is played back using photodiodes having normalized photodetector sizes of 16 $\mu$m, 10 $\mu$m, 4 $\mu$m, and 2 $\mu$m, respectively. FIGS. 37 and 38 show how the RF signal and the focusing error signal vary when a DVD is played back using photodiodes having normalized photodetector sizes of 6 $\mu$m and 8 $\mu$m, respectively.

Figure 33:
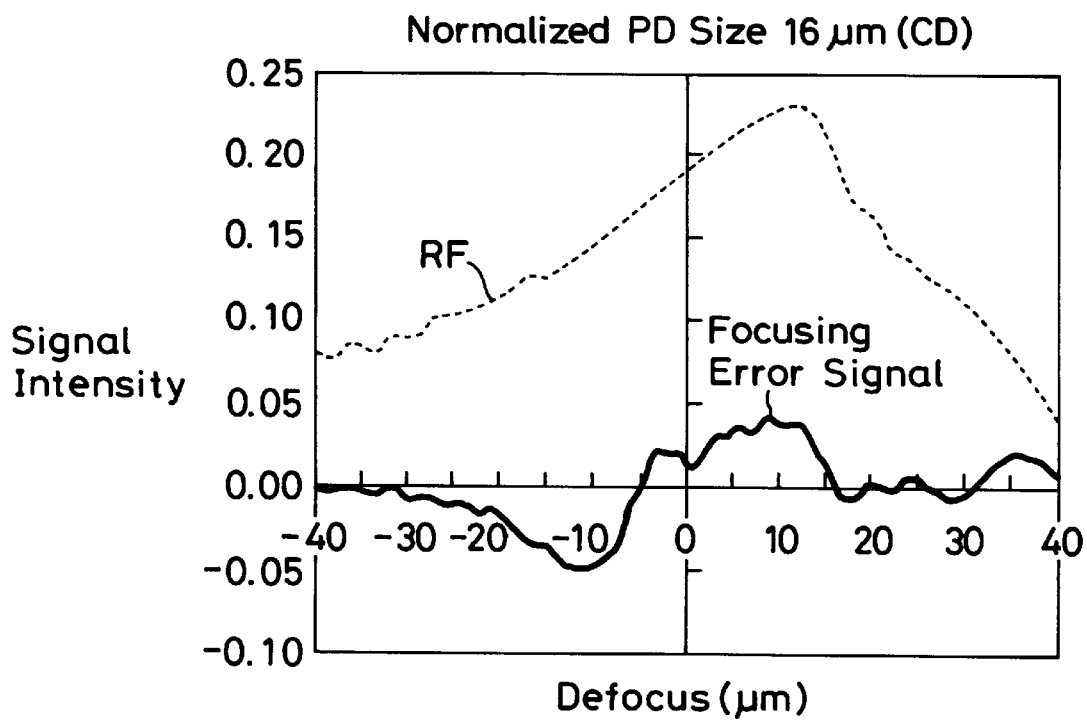
FIG. 33 is a diagram showing the characteristics of a focusing error signal and an RF signal upon playing back a CD with a normalized detector size of 16 μm.

As shown in FIG. 33, when a CD is played back using the photodiode having the normalized photodetector size of 16 $\mu$m, the focusing error signal does not have a so-called S curve, but rather has a large minimal value (V-shaped notch) in a positive range, making it difficult to effect the focusing servo process stably.

Figure 34:
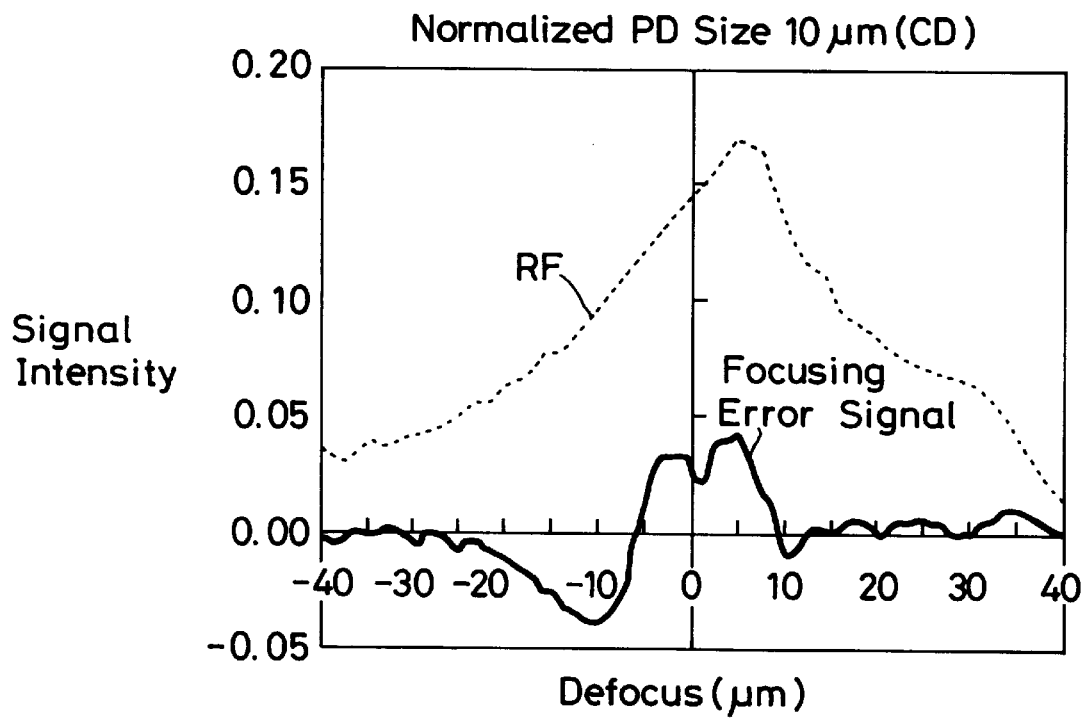
FIG. 34 is a diagram showing the characteristics of a focusing error signal and an RF signal upon playing back a CD with a normalized detector size of 10 μm.

As shown in FIG. 34, when a CD is played back using the photodiode having the normalized photodetector size of 10 $\mu$m, the focusing error signal has a somewhat high positive level, resulting in characteristics that make it possible to carry out the focusing servo process.

As shown in FIG. 35, when a CD is played back using the photodiode having the normalized photodetector size of 4 $\mu$m, the focusing error signal has a relatively distinct S curve. When a CD is played back using the photodiode having the normalized photodetector size of 2 $\mu$m, as shown in FIG. 36, the focusing error signal has an irregular S curve.

Therefore, for the focusing error signal to have a satisfactory S curve when a CD is played back, the normalized photodetector size should be about 15 $\mu$m or less (i.e., smaller than about 16 $\mu$m), preferably 14 $\mu$m or less, and more preferably 10 $\mu$m or less, and should have a lower limit of about 3 $\mu$m (i.e., greater than 2 $\mu$m), and preferably 4 $\mu$m.

As shown in FIG. 38, when a DVD is played back using the photodiode having the normalized photodetector size of 8 $\mu$m, the focusing error signal has a distinct S curve. When a DVD is played back using the photodiode having the normalized photodetector size of 6 $\mu$m, as shown in FIG. 37, the focusing error signal has a dead zone (where the gradient is small) in the vicinity of a zero-crossing point thereof.

Consequently, for the focusing error signal to have a good S curve when a DVD is played back, the normalized photodetector size should be of a value greater than 7 $\mu$m, and preferably 8 $\mu$m or greater.

For reproducing information recorded in the information recording layer from the output signal from the photodetector unit, the normalized photodetector size should preferably be in the range from about 1.8 $\mu$m to about 16 $\mu$m for the purpose of holding jitter below a predetermined level. From the practical standpoint, the normalized photodetector size should preferably be in the range from about 4 $\mu$m to about 14 $\mu$m. To detect a sufficient quantity of returning light when a DVD is played back, the normalized photodetector size should preferably be of 10 $\mu$m or greater.

For generating a focusing error signal from the output signal from the photodetector unit, the normalized photodetector size should be in the range from about 3 $\mu$m to about 15 $\mu$m, and more preferably from 4 $\mu$m to 14 $\mu$m, to give the focusing error signal a good S curve for the playback of the CD 10.

For producing a focusing error signal having a good S curve when the DVD 20 is played back, the normalized photodetector size should be 7 $\mu$m or greater, and preferably 8 $\mu$m or greater.

If both the RF signal (reproduced information signal) and the focusing error signal form the output signal from the photodetector unit, then the normalized photodetector size should satisfy both conditions to obtain the reproduced information signal and conditions to obtain the focusing error signal. Specifically, the normalized photodetector size should preferably be in the range from about 8 $\mu$m to 14 $\mu$m.

While the present invention has been described with respect to the selective playback of two types of discs, i.e., a CD and a DVD, the principles of the present invention are also applicable to the selective playback of three or more types of discs or other recording mediums than discs. The present invention is further applicable to the recording of information on recording mediums, rather than the reproduction of recorded information from recording mediums.

According the present invention, the optical pickup device requires no mechanically moving parts for selectively playing back recording mediums of different substrate thicknesses. The optical pickup device can be used in vibratory environments, is less liable to malfunction, can be reduced in size, and can be manufactured inexpensively.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An apparatus for recording information selectively on and reproducing information selectively from a first recording medium having an information recording layer on a substrate having a first thickness or a second recording medium having an information recording layer on a substrate having a second thickness, comprising:

a light source which generates light to be applied to the information recording layer of the first or second recording medium;

an optical system which converges the light generated by said light source and applies the converged light to said information recording layer of the first or second recording medium; and a photodetector for detecting light returning from said information recording layer of the first or second recording mediums;

wherein said photodetector has a size of at least 10 mm and at most 14 mm, which is normalized based on a magnification of said optical system; and wherein output from said photodetector is supplied to a focusing servo circuit which outputs in response thereto a focusing servo signal, said output from said photodetector also being supplied to a circuit which generates therefrom a signal representative of information recorded on said information recording layer of the first or second recording mediums.

2. An apparatus according to claim 1, wherein output of said photodetector is supplied to a circuit which produces therefrom a signal representative of information recorded on said recording layer of the first or second recording mediums.

3. An apparatus for recording information selectively on and reproducing information selectively from a first recording medium having an information recording layer on a substrate having a first thickness or a second recording medium having an information recording layer on a substrate having a second thickness, comprising:

a light source which generates light to be applied to the information recording layer of the first or second recording medium;

an optical system which converges the light generated by said light source and applies the converged light to said information recording layer of the first or second recording medium; and a photodetector for detecting light returning from said information recording layer of the first or second recording mediums;

said photodetector having a normalized detector size of at least 3 mm and at most 16 mm;

wherein output from said photodetector is supplied to a focusing servo circuit which outputs in response thereto a focusing servo signal, said output from said photodetector also being supplied to a circuit which generates therefrom a signal representative of information recorded on said information recording layer of the first or second recording mediums.

4. An apparatus according to claim 1, wherein said first recording medium has a recording density greater than said second recording medium.

5. An apparatus according to claim 1, further comprising:

a comparator which recieves an output signal of said photodetector and distinguishes between said first recording medium and said second recording medium using said output signal of said photodetector; and an equalizer which receives an output signal from said comparator and equalizes an output signal from said photodetector in response to whether said first recording medium or said second recording medium is being read.

6. An apparatus for recording information selectively on and reproducing information selectively from a first recording medium having an information recording layer on a substrate having a first thickness or a second recording medium having an information recording layer on a substrate having a second thickness, comprising:

a light source which generates light to be applied to the information recording layer of the first or second recording medium;

an optical system which converges the light generated by said light source and applies the converged light to said information recording layer of the first or second recording medium;

a photodetector for detecting light returning from said information recording layer of the first or second recording mediums, said photodetector having a normalized detector size of at least 3 mm and at most 16 mm;

a comparator which receives an output signal of said photodetector and distinguishes between said first recording medium and said second recording medium using said output signal of said photodetector; and an equalizer which receives an output signal from said comparator and equalizes an output signal from said photodetector in response to whether said first recording medium or said second recording medium is being read;

wherein said comparator distinguishes between said first recording medium and said second recording medium by comparing a level of the output signal from said photodetector with a predetermined value.

7. An apparatus according to claim 1, further comprising:
a comparator which recieves an output signal of said photodetector and distinguishes between said first recording medium and said second recording medium using said output signal of said photodetector; and
a control circuit which receives an output signal of said comparator and which controls said optical system according to different tracking control processes when said first recording medium is read and when said second recording medium is read, as determined by said comparator.

8. An apparatus for recording information selectively on and reproducing information selectively from a first recording medium having an information recording layer on a substrate having a first thickness or a second recording medium having an information recording layer on a substrate having a second thickness, comprising:
a light source which generates light to be applied to the information recording layer of the first or second recording medium;
an optical system which converges the light generated by said light source and applies the converged light to said information recording layer of the first or second recording medium;
a photodetector for detecting light returning from said information recording layer of the first or second recording mediums, said photodetector having a normalized detector size of at least 3 mm and at most 16 mm;
a comparator which receives an output signal of said photodetector and distinguishes between said first recording medium and said second recording medium using said output signal of said photodetector;
an equalizer which receives an output signal from said comparator and equalizes an output signal from said photodetector in response to whether said first recording medium or said second recording medium is being read;
a binary signal generator which receives an output signal from said equalizer and which produces therefrom a binary signal representative of information recorded on said first or second recording medium;
a demodulator which receives and demodulates an output signal from said binary signal generator; and
a phase locked loop circuit which receives said output signal from said comparator and which provides a first clock signal to said demodulator when said first recording medium is being read and a second clock signal, different from said first clock signal, when said second recording medium is being read.

9. An apparatus according to claim 1, further comprising a processing circuit which processes an output signal of said photodetector, said processing circuit comprising:

a comparator which receives said output signal of said photodetector and determines therefrom whether said first or said second recording medium is being used.

10. An apparatus according to claim 9, further comprising:
a clock circuit which receives an output signal from said comparator and which provides a first clock signal to said processing circuit when said first recording medium is being used and a second clock signal, different from said first clock signal, when said second recording medium is being used.

11. An apparatus according to claim 9, further comprising:
a smoothing circuit which receives said output signal of said photodetector, smoothes said output signal of said photodetector and provides said output signal of said photodetector to said comparator.

12. An apparatus for recording information selectively on and reproducing information selectively from a first recording medium having an information recording layer on a substrate having a first thickness or a second recording medium having an information recording layer on a substrate having a second thickness, comprising:
a light source which generates light to be applied to the information recording layer of the first or second recording medium;
an optical system which converges the light generated by said light source and applies the converged light to said information recording layer of the first or second recording medium;
a photodetector for detecting light returning from said information recording layer of the first or second recording mediums, said photodetector having a normalized detector size of at least 3 mm and at most 16 mm;
a comparator which receives an output signal of said photodetector and distinguishes between said first recording medium and said second recording medium using said output signal of said photodetector; and
a control circuit which receives an output signal of said comparator and which controls said optical system according to different tracking control processes when said first recording medium is read and when said second recording medium is read, as determined by said comparator;
wherein:
said first thickness is greater than said second thickness;
said tracking control process is a three beam tracking process when said first recording medium is being used; and
said tracking control process is a differential push-pull tracking process when said second recording medium is being used.

* * * * *

UNITED STATES PATENT AND TRADEMARK OFFICE
CERTIFICATE OF CORRECTION

PATENT NO. : 5,875,164
DATED : February 23, 1999
INVENTOR(S) : Akio YAMAKAWA and Kamon UEMURA It is certified that error appears in the above-identified patent and that said Letters Patent is hereby corrected as shown below:

On the title page, item [54] and Column 1, lines 1-6;

The Title should read:

-- APPARATUS AND METHOD FOR RECORDING AND REPRODUCING INFORMATION FROM A PLURALITY OF RECORDING MEDIUM HAVING DIFFERENT THICKNESSES AND RECORDING DENSITIES --.

Claim 5 should read:

-- An apparatus according to claim 1, further comprising:

a comparator which receives an output signal of said photodetector and distinguishes between said first recording medium and said second recording medium using said output signal of said photodetector; and an equalizer which receives an output signal from said comparator and equalizes an output signal from said photodetector in response to whether said first recording medium or said second recording medium is being read. --

Claim 7 should read:

-- An apparatus according to claim 1, further comprising:

a comparator which receives an output signal of said photodetector and distinguishes between said first recording medium and said second recording medium using said output signal of said photodetector; and

UNITED STATES PATENT AND TRADEMARK OFFICE
CERTIFICATE OF CORRECTION

PATENT NO.  : 5,875,164
DATED       : February 23, 1999
INVENTOR(S) : Akio YAMAKAWA and Kamon UEMURA It is certified that error appears in the above-identified patent and that said Letters Patent is hereby corrected as shown below:

a control circuit which receives an output signal of said comparator and which controls said optical system according to different tracking control processes when said first recording medium is read and when said second recording medium is read, as determined by said comparator. --

Signed and Sealed this

Twenty-fourth Day of August, 1999

Attest:

Q. TODD DICKINSON

Attesting Officer

Acting Commissioner of Patents and Trademarks